United States Patent [19]

Egashira et al.

[11] Patent Number: 5,726,716
[45] Date of Patent: Mar. 10, 1998

[54] PERSPECTIVE REPRESENTATION SYSTEM FOR DISPLAYING PORTIONS OF AN ORIGINAL PICTURE IN A DISPLAYABLE PICTURE

[75] Inventors: Toru Egashira; Kazutoshi Oishi, both of Tokyo, Japan

[73] Assignee: NEC Corporation, Tokyo, Japan

[21] Appl. No.: 612,414

[22] Filed: Mar. 7, 1996

[30] Foreign Application Priority Data

| Mar. 7, 1995 | [JP] | Japan | 7-047534 |
| Jul. 19, 1995 | [JP] | Japan | 7-182306 |
| Jul. 19, 1995 | [JP] | Japan | 7-182307 |
| Aug. 15, 1995 | [JP] | Japan | 7-229670 |

[51] Int. Cl.$^6$ .................................. H04N 9/74
[52] U.S. Cl. ............ 348/580; 348/581; 348/588; 348/596
[58] Field of Search ............... 348/580, 581, 348/588, 596, 559, 704; H04N 9/74, 3/223

[56] References Cited

U.S. PATENT DOCUMENTS

| 4,790,028 | 12/1988 | Ramage | 348/588 |
| 5,491,517 | 2/1996 | Kreitman | 348/581 |
| 5,528,194 | 6/1996 | Ohtani | 348/580 |

Primary Examiner—Sherrie Hsia
Attorney, Agent, or Firm—Sughrue, Mion, Zinn, Macpeak & Seas, PLLC

[57] ABSTRACT

In response to the designation of a rectangular partial region of an original picture to be reproduced, the designation of a rectangular partial region of the displayable picture at the reproduction end, and information corresponding relationship between the displayable picture and the original picture that an image of a certain region of the displayable picture and of the original picture are equivalent to each other, an instruction is generated for a reproduction operation to reuse part of the displayable picture, as it is reusable as part of the region at the reproduction end, and to reproduce from the original picture a region at the reproduction end in order to reproduce a part of the original picture in the displayable picture.

21 Claims, 33 Drawing Sheets

FIG. 1 PRIOR ART
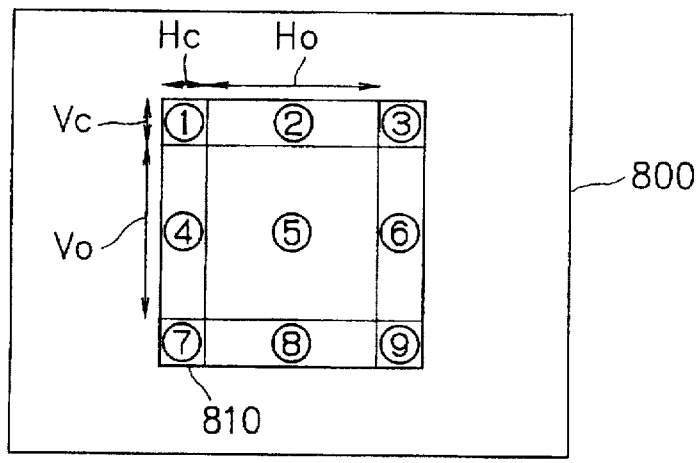
DISPLAYABLE PICTURE
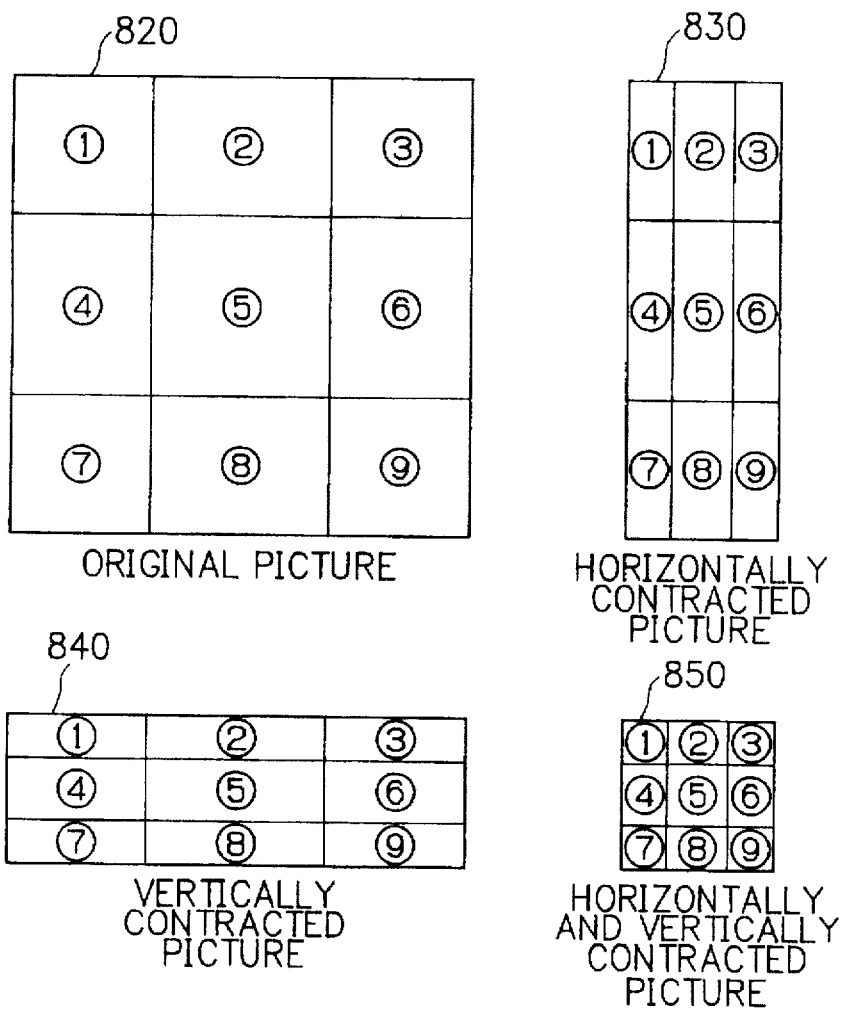

FIG. 24A
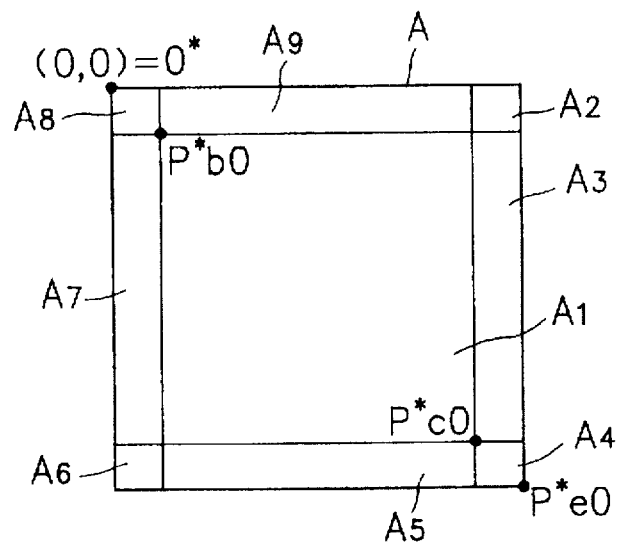
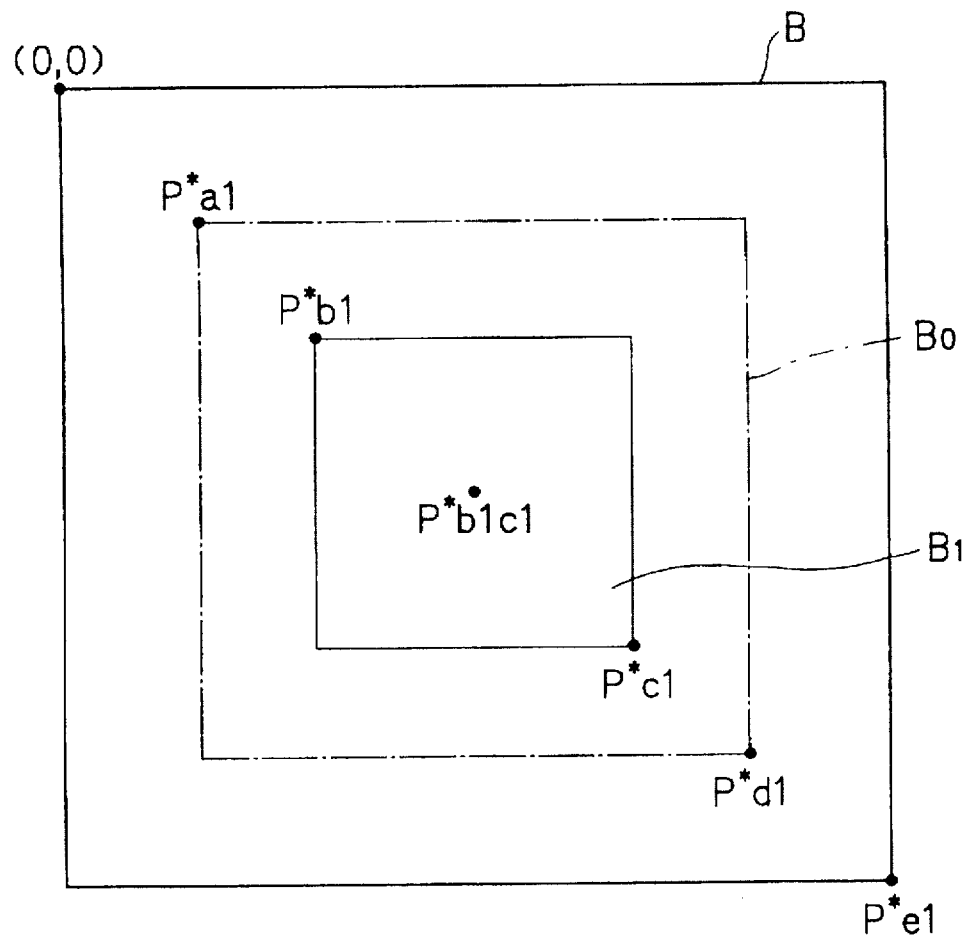

FIG. 24B
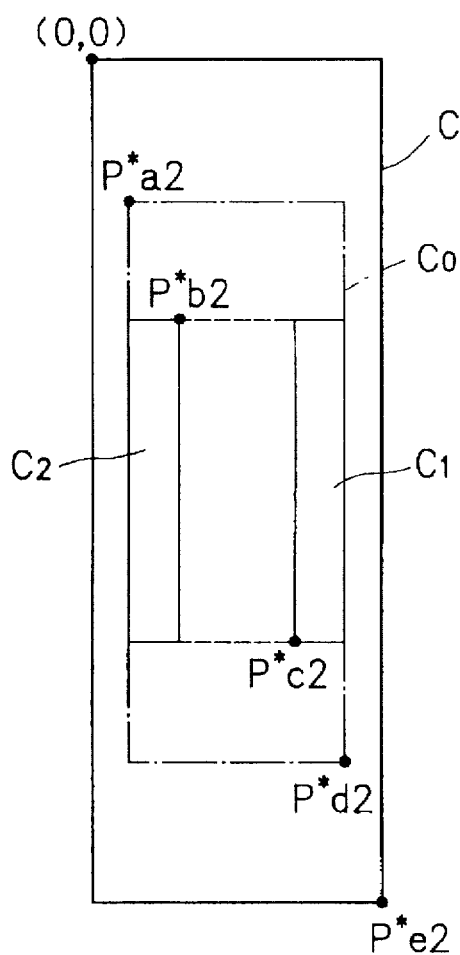
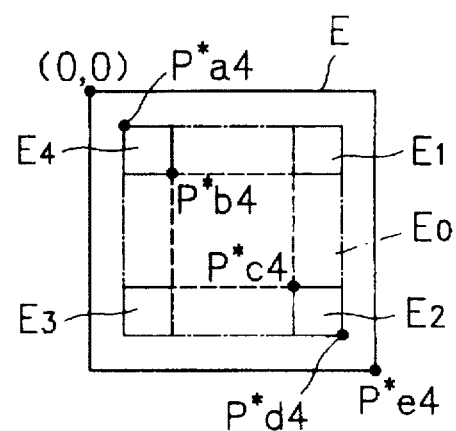
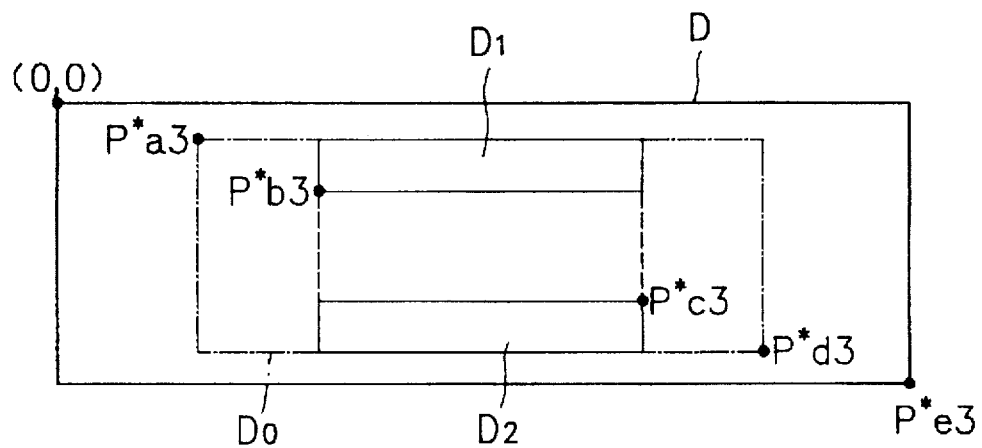

F I G. 30
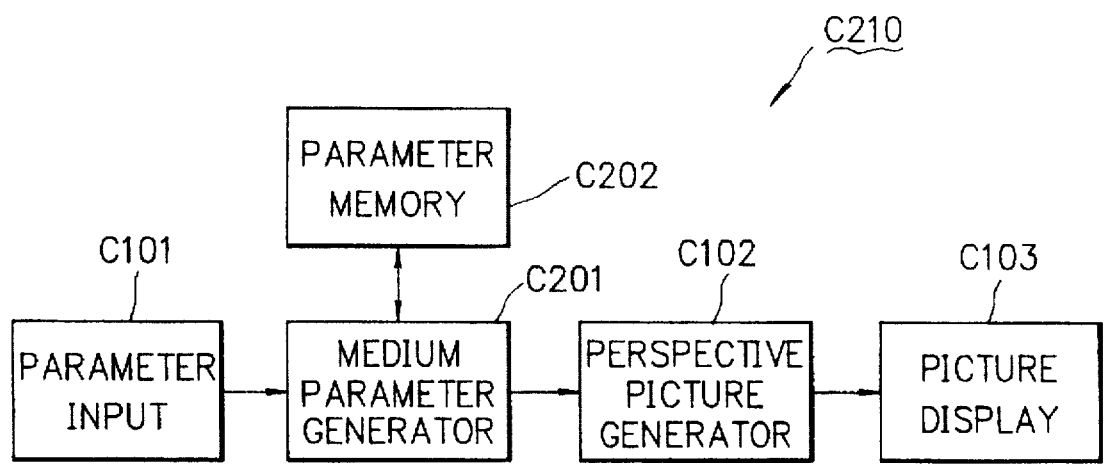

PERSPECTIVE REPRESENTATION SYSTEM FOR DISPLAYING PORTIONS OF AN ORIGINAL PICTURE IN A DISPLAYABLE PICTURE

BACKGROUND OF THE INVENTION

The present invention generally relates to a perspective representation system and more particularly, to a system and a computer-aided method for displaying a real-time continuous perspective image of a voluntarily designatable rectangular region of a displayed picture or displayable picture.

DESCRIPTION OF THE RELATED ART

Recent years have observed an increased interest in a display system adapted to display a virtual perspective view of a rectangular partial region of a picture, such as an image-continuous combination of an equi-enlarged central region defined by an internal rectangle and a location-adaptively contracted peripheral region defined between the internal rectangle and an outside rectangle. In a typical case, such rectangles are voluntarily designated by clicking their corner points.

Such a perspective representation is presented in a real-time displaying manner from a display memory in which a displayable picture is merged by copying a necessary number of subregions from a combination of an enlarged image (hereafter "standard original picture") of an image cut out by an outside rectangle and a number of contracted images (hereafter each respectively "contracted original picture") thereof.

Typically, there is edited a virtual perspective view of a rectangular whole region of a standard original picture within a smaller rectangular region of the whole region, so that a rectangular central subregion of the standard original picture is displayed, as it is, and enclosed by a number of peripheral subregions of contracted original pictures, with a continuity of image kept therebetween.

FIG. 1 illustrates a principle of the perspective representation.

In FIG. 1, designated at reference character 800 is a conceptual total image of a displayable picture stored in an unshown displayable picture memory that is connectable to a display for displaying an entirety or part of the displayable picture.

The displayable picture contains a perspective picture 810 as a virtual perspective view of a standard original picture 820 stored in an unshown original picture memory. The original picture 820 is divided into a total of nine segments ①to ⑨. The original picture may be a multiplied picture of a displayed picture.

The standard original picture 820 is contracted in a horizontal direction to provide a horizontally contracted original picture 830, in a vertical direction to provide a vertically contracted original picture 840, and in both horizontal and vertical directions to provide a horizontally and vertically contracted original picture 850.

The perspective picture 810 comprises a mid-central segment ⑤ of the standard original picture 820, a left central segment ④ and a right central segment ⑥ of the horizontally contracted original picture 830, an upper central segment ② and a lower central segment ⑧ of the vertically contracted original picture 840, and four corner segments ①③⑦⑨ of the horizontally and vertically contracted original picture 850.

FIG. 2 is an illustration for an analytical expression of the perspective representation of FIG. 1.

As will be readily seen, reference characters ①-⑨ in FIG. 1 and septdecimal characters in FIG. 2 have relationships to each other, such that:

the segment ⑤ in the perspective picture 810 corresponds to a ☐816-818-81B-81A, and that in the standard original picture 820 (=☐821-822-824-823) corresponds to a ☐825-826-828-827;

the segment ④ in the picture 810 corresponds to a ☐815-816-81A-819, and that in the horizontally contracted original picture 830 (=☐831-832-83C-83B) corresponds to a ☐833-834-838-837;

the segment ⑥ in the picture 810 corresponds to a ☐817-818-81C-81B, and that in the picture 830 corresponds to a ☐835-836-83A-839;

the segment ② in the picture 810 corresponds to a ☐812-813-817-816, and that in the vertically contracted original picture 840 (=☐841-844-84C-849) corresponds to a ☐842-843-846-845;

the segment ⑧ in the picture 810 corresponds to a ☐81A-81B-81F-81E, and that in the picture 840 corresponds to a ☐847-848-84B-84A;

the segment ① in the picture 810 corresponds to a ☐811-812-816-815, and that in the horizontally and vertically contracted original picture 850 (=☐851-854-85G-85D) corresponds to a ☐851-852-856-855;

the segment ③ in the picture 810 corresponds to a ☐813-814-818-817, and that in the picture 850 corresponds to a ☐853-854-858-857;

the segment ⑦ in the picture 810 corresponds to a ☐819-81A-81E-81D, and that in the picture 850 corresponds to a ☐859-85A-85E-85D; and the segment ⑨ in the picture 810 corresponds to a ☐81B-81C-81G-81F, and that in the picture 850 corresponds to a ☐85B-85C-85G-85F.

The displayable picture 800, standard original picture 820, horizontally contracted original picture 830, vertically contracted original picture 840 and horizontally and vertically contracted original picture 850 have respective analog points or digital pixels therein with their positions defined by an X-Y coordinate system, as an upper left corner of each picture is located at an origin (0,0) of the coordinate system. An X-axis extends from the origin (0,0) along an upper horizontal side of each picture, i.e. in a rightward direction, as it is a positive sense. A Y-axis extends from the origin (0,0) along a left vertical side of each picture, i.e. in a downward direction, as it is a positive sense.

For an arbitrary point $P_1$ on any picture, assuming an X-coordinate $X_1$ and a Y-coordinate $Y_1$ of a position the point $P_1$ has in the Y-X coordinate system, a vector representation of the point $P_1$ is made by a two-dimensional position vector $(X_1,Y_1)$ relative to the origin (0,0) or by suffixing a *-mark to the reference character $P_1$ of the point, like $P^*_1$.

For example, four solid circles at points 811, 816, 81B and 81G on a diagonal line of the perspective picture 810 are represented by corresponding position vectors P*a0, P*b0, P*c0 and P*d0.

Likewise, four solid circles at points 821, 825, 828 and 824 on a diagonal line of the standard original picture 820 are represented by corresponding position vectors (0,0), P*b1, P*c1 and P*e1; four solid circles at points 831, 834, 839 and 83C on a diagonal line of the horizontally contracted original picture 830 are represented by corresponding position vectors (0,0), P*b2, P*c2 and P*e2; four solid circles at points 841, 845, 848 and 84C on a diagonal line of the vertically contracted original picture 840 are represented by corresponding position vectors (0,0), P*b3, P*c3 and P*e3; and four solid circles at points 851, 856, 85B and 85G on a diagonal line of the horizontally and vertically contracted original picture 850 are represented by corresponding position vectors (0,0), P*b4, P*c4 and P*e4.

The suffix * will sometimes be employed, as necessary for a reference character to be acknowledged in terms of a vector (as opposed to a scalar), whether the character refers to a constant or a variable. The origin (0,0) may sometimes be represented as 0*.

A BOX function for designating a semi-close semi-open region is defined as an operator between vectors $P^*_1=(X_1, Y_1)$ and $P^*_2=(X_2, Y_2)$ such that $BOX[P^*_1, P^*_2]$ or $BOX[(X_1, Y_1), (X_2, Y_2)]$ represents a rectangular region defined by a combination of a section $(X_1, X_2)$ of X-coordiante, i.e. $X_1 \leq X < X_2$, and a section $(Y_1, Y_2)$ of Y-coordiante, i.e. $Y_1 \leq Y < Y_2$.

For example, in FIG. 2, the displayable picture 800, which has four corners thereof at positions (0,0)=0*, (Hf, 0), (0, Vf) and (Hf, Vf), is representable by BOX[0*, (Hf, Vf)]; and the perspective picture 810 is representable by BOX[P*a0, P*d0].

Likewise, the four original pictures 820, 830, 840 and 850 are representable by BOX[0*, P*e1], BOX[0*, P*e2], BOX[0*, P*e3] and BOX[0*, P*e4], respectively.

Moreover, a pair of vector (two-term) operators "+ (sum)" and "− (difference)" are defined such that:

$(X_1, Y_1)+(X_2, Y_2)=(X_1+X_2, Y_1+Y_2)$; and $(X_1, Y_1)-(X_2, Y_2)=(X_1-X_2, Y_1-Y_2)$.

Naturally, $(X_1, Y_1)+(X_2, Y_2)=(X_2, Y_2)+(X_1, Y_1)$.

It is concluded for an arbitrary scalar quantity z that $z(X_1, Y_1)=(zX_1, zY_1)=(X_1 z, Y_1 z)=(X_1, Y_1)z$ and, if and only when $z \neq 0$, $(1/z)(X_1, Y_1)=((1/z)X_1, (1/z)Y_1)=(X_1/z, Y_1/z)=(X_1(1/z), Y_1(1/z))=(X_1, Y_1)(1/z)=(X_1, Y_1)/z$.

As a matter of course, "$-(X_1, Y_1)$"=$-1(X_1, Y_1)=(-X_1, -Y_1)$="$+(-X_1, -Y_1)$", and $(X_1, Y_1)+0^*=0^*+(X_1, Y_1)=(X_1, Y_1)$.

Further, another vector (two-term) operator "•(product)" is defined such that $(X_1, Y_1)•(X_2, Y_2)=(X_2, Y_2)•(X_1, Y_1)=(X_1 X_2, Y_1 Y_2)$, and $(X_1, Y_1)•0^*=0^*•(X_1, Y_1)=0^*$.

For example, letting Rx be a contraction ratio of the horizontally contracted picture 830 to the standard original picture 820 and Rx be a contraction ratio of the vertically contracted picture 840 to the standard original picture 820, the right lower corner points 83C, 84C and 85G of the contracted original pictures 820, 830 and 840 can be expressed such that:

P*e2=(Rx, 1)•P*e1;

P*e3=(1, Ry)•P*e1; and

P*e4=(Rx, Ry)•P*e1.

Furthermore, an XY function is defined for a pair of arbitrarily ordered vectors to designate a single vector of which an X-component is equivalent to that of a left one of ordered vectors and a Y-component is equivalent to that of the remaining one, such that:

$XY((X_1, Y_1), (X_2, Y_2))=(X_1, Y_2)$.

For example, when the □815-816-81A-819 (i.e. the left central region as the segment ④ of the perspective picture 810) is concerned, its left upper corner point 815 and right lower corner point 81A can be expressed such that:

position vector of the point 815=XY(P*a0, P*b0); and position vector of the point 81A=XY(P*b0, P*c0).

Moreover, when the □817-818-81C-81B (i.e. the right central region as the segment ⑥ of the perspective picture 810) is concerned, its left upper corner point 817 and right lower corner point 81C can be expressed such that:

position vector of the point 817=XY(P*c0, P*b0); and position vector of the point 81C=XY(P*d0, P*c0).

Further, when the □812-813-817-816 (i.e. the upper central region as the segment ② of the perspective picture 810) and the □81A-81B-81F-81E (i.e. the lower central region as the segment ⑧ of the perspective picture 810) are concerned, the left upper corner point 812 of the former and the right lower corner point 81F of the latter can be expressed such that:

position vector of the point 812=XY(P*b0, P*a0); and position vector of the point 81F=XY(P*c0, P*d0).

Furthermore, when the □813-814-818-817 (i.e. the right upper region as the segment ③ of the perspective picture 810) is concerned, its left upper corner point 813 and right lower corner point 818 can be expressed such that:

position vector of the point 818=XY(P*c0, P*a0); and position vector of the point 818=XY(P*d0, P*b0).

Still more, when the □819-81A-81E-81D (i.e. the left lower region as the segment ⑦ of the perspective picture 810) is concerned, its left upper corner point 819 and right lower corner point 81E can be expressed such that:

position vector of the point 819=XY(P*a0, P*c0); and position vector of the point 81E=XY(P*b0, P*d0).

Accordingly, it will be understood that the perspective picture 810 (=□811-814-81D-81G) is a perspective representation of the standard original picture 820 (=□811-814-81D-81G), such that:

BOX[P*b0, P*c0] (i.e. ⑤ in 810),

BOX[XY(P*a0, P*b0), XY(P*b0, P*c0)] (i.e. ④ in 810),

BOX[XY(P*c0, P*b0), XY(P*d0, P*c0)] (i.e. ⑥ in 810),

BOX[XY(P*b0, P*a0), XY(P*c0, P*b0)] (i.e. ② in 810),

BOX[XY(P*b0, P*c0), XY(P*c0, P*d0)] (i.e. ⑧ in 810),

BOX[P*a0, P*b0] (i.e. ① in 810),

BOX[XY(P*c0, P*a0), XY(P*d0, P*b0)] (i.e. ③ in 810),

BOX[XY(P*a0, P*c0), XY(P*b0, P*d0)] (i.e. ⑦ in 810), and

BOX[P*c0, P*d0] (i.e. ⑨ in 810) are equivalent in size and image to

BOX[P*b1, P*c1] (i.e. ⑤) of the standard original picture 820,

BOX[YX(0*, P*b2), XY(P*b2, P*c2)] (i.e. ④) of the horizontally contracted picture 830, BOX[YX(P*c2, P*b2), XY(P*e2, P*c2)] (i.e. ⑥) of the picture 830, BOX[YX(P*b3, 0*), XY(P*c3, P*b3)] (i.e. ②) of the vertically contracted picture 840, BOX[YX(P*b3, P*c3), XY(P*c3, P*e3)] (i.e. ⑧) of the picture 840, BOX[0*, P*b4] (i.e. ①) of the horizontally and vertically contracted picture 850, BOX[XY(P*c4, 0*), XY(P*e4, P*b4)] (i.e. ③) of the picture 850, BOX[YX(0*, P*c4), XY(P*b4, P*e4)] (i.e. ⑦) of the picture 850, and BOX[P*c4, P*e4] (i.e. ⑨) of the picture 850, respectively, and that:

P*b2=(Rx, 1)•P*b1;

P*b3=(1, Ry)•P*b1;

P*b4=(Rx, Ry)•P*b1;

P*c2=(Rx, 1)•P*c1;

P*c3=(1, Ry)•P*c1; and
P*c4=(Rx, Ry)•P*c1.

Such a system has been disclosed in the Japanese Patent Application Laid-Open Publication No. 3-113578.

FIG. 3 is a block diagram of such a conventional perspective representation system.

In FIG. 3, designated at reference character 710 is the conventional system. The system 710 comprises a parameter input means 102, a perspective representation control means 703, an image reproduction means 705 as an image synthesizer, an original picture memory 101 for storing a standard original picture 820, as it is read from an unshown picture source and multiplied, and horizontally and/or vertically contracted pictures 830, 840 and 850 thereof, a displayable picture memory 107 for storing a current displayable picture 800, and a picture display 108 for reading an entirety or part of the displayable picture 800 from the memory 107 to visualize the same.

The parameter input means 102 input a number of necessary parameters for perspective representation, such as vector quantities P*a0, P*b0 etc., from a coordinate input device such as a keyboard or mouse.

The control means 703 is responsive to the input parameters to output a number of control signals.

The original picture memory 101 is responsive to some control signals (supplied thereto directly or via 705) to have five current original pictures 820 to 850 prepared therein, permitting necessary accesses thereto.

The reproduction means 705 is responsive to the control signals to copy an adequate one of control-signal-dependent nine rectangular subregions ① to ⑨ of a respective one of the current original pictures 820 to 850 in the original picture memory 101 onto a corresponding one of control-signal-dependent nine rectangular subregions ① to ⑨ of a perspective picture 810 to be edited in a frame of the current displayable picture 800.

In the system 710, picture data are all transferred from the original picture memory 101 via the image reproduction means 705 to the displayable picture memory 107.

Therefore, it needs a relatively long time for the perspective picture 810 to be fully edited, resulting in a long delay required after a parameter change until the perspective picture 810 is displayed.

The conventional system 710 permits an entirety of the original picture 820 and a concerned subregion thereof, i.e. part of the central region ⑤, to be concurrently observed, and is adaptive for a network monitoring in which a center of the concerned region is set for a desirable match with that of a displayed picture.

Such a network monitoring system has been proposed in a report "Real-Time Bifocal Network Visualization", by Y. Fuji et al., IEICE (the Institute of Electronics, Information and Communication Engineers of Japan), IN93-101, pp. 31–36, 1993-10.

The network monitoring system is distributed, as a network to be monitored extends beyond a limit of a concentrated monitoring.

In a distributed monitoring, a plurality of perspective picture editors, as monitors each analogous to the system 701, have their concerned regions in their perspective pictures.

However, if an accident occurs in the network, operators as monitoring persons at some editors are needed to cooperate with each other, observing an identical concerned region centered to an identical point.

In the conventional monitoring system, such operators are required to communicate with each other before they input new parameters so that their editors display pictures matching at least the center.

Such communications are required each time when a concerned region moves.

Moreover, as the accident develops with time, respective editors need to have their original pictures updated such that the original pictures match between the editors. Such a matching becomes difficult, as the number of cooperating editors increases and the frequency of such update becomes high.

Further, a standard original picture may include a figure such as a circle or a line segment synthesized therein to represent a node or a link. Such a figure is contracted in different contraction ratios to be represented in contracted original pictures, where contracted figures have their shapes and coordinates, thus needing a set of data thereon.

Furthermore, when an additional editor joins a group of cooperating editors, the former needs to update a number of original pictures therein to have a match with the latter. Even if necessary original pictures are read by communications from one of the cooperating editors to the joining editor, it takes a certain period of time during which those editors may have updated original pictures differernt from the original pictures read by this editor.

The conventional system 710 prepares and stores a standard original picture, a horizontally contracted original picture, a vertically contracted original picture and a horizontally and vertically contracted original picture respectively of a total original region to be employed for displaying a perspective view as a virtual perspective view of the total original region within a smaller region than the standard original picture.

However, it is necessary for displaying a perspective image of a partial original region to prepare and store a standard original picture, a horizontally contracted original picture, a vertically contracted original picture and a horizontally and vertically contracted original picture respectively of the partial original region, as the original pictures of the total original region are not reusable.

Still less, the conventional system 710 responds to a set of input parameters for displaying a perspective picture edited based on the input parameters so that, if an input paramter has a significant difference to an employed parameter for a current perspective picture, a corresponding instantaneous variation is caused in the perspective picture, with a tendency to miss a concerned point on the picture.

The present invention has been achieved with such points in mind.

SUMMARY OF THE INVENTION

It therefore is a first object of the present invention to provide a perspective representation system and a perspective representation method having a reduced delay time.

To achieve the first object, a first embodiment of the present invention provides a perspective representation system including an original picture memory means for storing an original picture, a displayable picture memory means for storing a displayable picture, a picture reproduction means for reproducing the original picture in the displayable picture, a parameter input means for receiving image reproduction parameters, and a picture display means for visualizing the displayable picture, wherein the picture reproduction means comprises an original picture reproduction means for reproducing a partial image of a picture stored in the original picture memory means, a displayable picture reproduction means for reproducing a partial image of the displayable picture in the displayable picture, and a reproduction control means responsible for among the picture reproduction parameters a designation of a rectangular partial region of the original picture to be reproduced, a designation of a rectangular partial region of the displayable picture at the reproduction end, and information on a correspondence relationship between the displayable picture and the original picture that an image of a certain region of the displayable picture and an image of a certain region of the original picture are equivalent to each other, to instruct the displayable picture reproduction means for a reproduction to reuse part of the displayable picture, as it is reusable as part of the region at the reproduction end, and to reproduce from the original picture a region at the reproduction end insufficient of the reuse of the displayable picture.

According to the present invention, a displayable picture is partially reused so that a delay time is reduced.

According to the invention, the original picture memory means stores therein a standard original picture, a horizontally contracted original picture, a vertically contracted original picture and a horizontally and vertically contracted original picture, the parameter input means inputs a parameter of a perspective picture, and the system further comprises a perspective representation control means operable, when the parameter of the perspective picture is updated, to control the original and displayable picture reproduction means for a reproduction to a respective one of rectangular partial regions of the perspective picture.

According to the invention, the perspective representation control means is responsible for a moving direction of an arbitrary one of a total of four separation lines dividing the perspective picture horizontally into three regions and vertically into three regions, as the parameter of the perspective view is updated, to instruct the original and displayable picture reproduction means to execute the reproduction into a region lying at a forward side of the moving direction relative to the arbitrary separation line, with a priority to the reproduction into a region lying at an opposite side to the moving direction relative to the arbitrary separation line.

To achieve the first object, a second embodiment of the present invention provides a perspective representation method including the steps of storing an original picture, storing a displayble picture, reproducing the original picture in the displayable picture, receiving image reproduction parameters, and visualizing the displayable picture, wherein the original picture reproducing step comprises the substeps of reproducing a partial image of a picture stored, reproducing a partial image of the displayble picture in the displayable picture, and responding among the picture reproduction parameters a designation of a rectangular partial region of the original picture to be reproduced, a designation of a rectangular partial region of the displayable picture at the reproduction end, and information on a correspondence relationship between the displayable picture and the original picture that an image of a certain region of the displayable picture and an image of a certain region of the original picture are equivalent to each other, to instruct for a reproduction to reuse part of the displayable picture, as it is reusable as part of the region at the reproduction end, and to reproduce from the original picture a region at the reproduction end insufficient of the reuse of the displayable picture.

It is a second object of the present invention to provide a perspective representation system in which a plurality of perspective picture editors are permitted to have respective centers of rectangular subregions of perspective pictures thereof coincident with each other.

To achieve the second object, a third embodiment of the present invention provides a perspective representation system comprising a plurality of perspective picture editor means each for editing to display a perspective picture composed of a displayable rectangular subregion of a standard original picture, a subregion of a horizontally contracted picture of the standard original picture, a subregion of a vertically contracted picture of the standard original picture and a subregion of a horizontally and vertically contracted picture of the standard original picture, in a perspectively representing manner based on image synthesis parameters on a size of the perspective picture, a size of the standard original picture, a center coordinate of the rectangular subregion, a contraction ratio of the horizontally contracted picture to the standard original picture and a contraction ratio of the vertically contracted picture to the standard original picture, and a cooperation control means for controlling the plurality of perspective picture editor means, wherein the plurality of perspective picture editor means each include a means for transmitting to the cooperation control means the center coordinate, as it is changed, and a means for editing the perspective picture in accordance with the center coordinate, as it is transmitted from the cooperation control means, wherein the cooperation control means includes a means responsible to the center coordinate, as it is transmitted from one of the plurality of perspective picture editor means, for transmitting the same to the other perspective picture editor means.

It is a third object of the present invention to provide a perspective representation system in which a plurality of perspective picture editors are permitted to have a necessary number of matching original pictures.

To achieve the third object, a fourth embodiment of the present invention provides a perspective representation system comprising a plurality of perspective picture editor means, each for editing to display a perspective picture composed of a displayable rectangular subregion of a standard original picture, a subregion of a horizontally contracted picture of the standard original picture, a subregion of a vertically contracted picture of the standard original picture and a subregion of a horizontally and vertically contracted picture of the standard original picture, in a perspectively representing manner based on image synthesis parameters on a size of the perspective picture, a size of the standard original picture, a center coordinate of the rectangular subregion, a contraction ratio of the horizontally contracted picture to the standard original picture and a contraction ratio of the vertically contracted picture to the standard original picture, and a cooperation control means for controlling the plurality of perspective picture editor. The cooperation control means includes a means responsive to a set of externally input data on a figure to be added to an original picture set consisting of the standard original picture, the horizontally contracted original picture, the vertically contracted original picture and the horizontally and vertically contracted original picture and on coordinates for arranging the figure, to transmit the set of data on the figure and the arranging coordinates to the plurality of perspective picture editor means, and wherein the plurality of perspective picture editor means each include a modification means for modifying the original picture set in accordance with the set of data on the figure and the arranging coordinates, as they are transmitted thereto from the cooperation control means, and a perspective representation control means for generating the perspective picture from the original picture set, as it is modified by the modification means.

According to the invention, the perspective representation control means comprises a means responsive to the set of data transmitted from the cooperation control means for synthesizing the figure into the standard original picture, and a means responsive to the set of data transmitted from the cooperation control means for transforming the figure based on the contraction ratios to provide a horizontally contracted figure, a vertically contracted figure and a horizontally and vertically contracted figure and for synthesizing the horizontally contracted figure, the vertically contracted figure and the horizontally and vertically contracted figure into the horizontally contracted original picture, the vertically contracted original picture and the horizontally and vertically contracted original picture.

It is a fourth object of the present invention to provide a perspective representation system in which, when an additional editor joins a group of cooperating editors, the former is permitted to have a number of matching original pictures to the latter.

To achieve the fourth object, a fifth embodiment of the present invention provides a perspective representation system comprising a total of N perspective picture editor means, where N is a positive integer, each for editing to display a perspective picture composed of a displayable rectangular subregion of a standard original picture, a subregion of a horizontally contracted picture of the standard original picture, a subregion of a vertically contracted picture of the standard original picture and a subregion of a horizontally and vertically contracted picture of the standard original picture, in a perspectively representing manner based on image synthesis parameters on a size of the perspective picture, a size of the standard original picture, a center coordinate of the rectangular subregion, a contraction ratio of the horizontally contracted picture to the standard original picture and a contraction ratio of the vertically contracted picture to the standard original picture, and a cooperation control means for controlling the plurality of perspective picture editor means, wherein the cooperation control means includes a memory means for storing therein a set of externally input data a figure to be added to an original picture set consisting of the standard original picture, the horizontally contracted original picture, the vertically contracted original picture and the horizontally and vertically contracted original picture and on coordinates for arranging the figure, and a means for transmitting the set of stored data in the memory means to a total of M registered ones of the N perspective picture editor means, where M is a positive integer such that M≦N, and wherein a respective one of the N perspective picture editor means includes a modification means for modifying the original picture set in accordance with the set of data on the figure and the arranging coordinates, as they are transmitted thereto from the cooperation control means, a perspective representation control means for generating the perspective picture from the original picture set, as it is modified by the modification means, a memory device for storing therein an original picture set corresponding to a displayed perspective picture set at intervals of a predetermined time, and a means operative, when the respective perspective picture editor means is newly started, for reading the original picture set from the memory device of one of the N perspective picture editor means that has been started.

According to the invention, the cooperation control means further includes a means for deleting the set of stored data in the memory means after having indicated the memory device to store the original picture set corresponding to the displayed perspective picture.

According to the invention, the cooperation control means further includes a hold means for holding identification data of the M perspective picture editor means.

It is a fifth object of the present invention to provide a perspective representation system and a perspective representation method permitting a standard original picture, a horizontally contracted original picture, a vertically contracted original picture and a horizontally and vertically contracted original picture respectively of a total original region to be reused for editing to display a perspective picture of a designated rectangular region of the total original region.

To achieve the fifth object, a sixth embodiment of the present invention provides a perspective representation system including a memory means for storing an original picture set consisting of a standard original picture and horizontally contracted, vertically contracted and horizontally and vertically contracted pictures of the standard original picture, the system being operable for editing to display a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters on a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture, wherein the system further includes a computation means for computing coordinates of the displayable rectangular regions respectively of a region of the horizontally contracted picture corresponding to a designated region provided in the image synthesis parameters to designate a size of the standard original picture, a region of the vertically contracted picture corresponding to the designated region and a region of the vertically contracted picture corresponding to the designated region, as they are computed in accordance with the desiganted region and the contraction ratios, and a means responsive to the computed coordinates for reading from the memory means a rectangular region in the designated region of the standard original picture, a rectangular region in the corresponding region of the horizontally contracted picture, a rectangular region in the corresponding region of the vertically contracted picture and a rectangular region in the corresponding region of the horizontally and vertically contracted picture, to generate a perpsective picture corresponding to the designated region.

According to the invention, the system further comprises an input means for inputting the image synthesis parameters provided with the designated region.

To achieve the fifth object, a seventh embodiment of the present invention provides a perspective representation method comprising the steps of storing an original picture set consisting of a standard original picture and horizontally contracted, vertically contracted and horizontally and vertically contracted pictures of the standard original picture, editing to display a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters on a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture, computing coordinates of the displayable rectangular regions respectively of a region of the horizontally contracted picture corresponding to a designated region provided in the image synthesis parameters to designate a size of the standard original picture, a region of the vertically contracted picture corresponding to the designated region and a region of the vertically contracted picture corresponding to the designated region, as they are computed in accordance with the designated region and the contraction ratios, and responding to the computed coordinates for reading from the memory means a rectangular region in the designated region of the standard original picture, a rectangular region in the corresponding region of the horizontally contracted picture, a rectangular region in the corresponding region of the vertically contracted picture and a rectangular region in the corresponding region of the horizontally and vertically contracted picture, to generate a perpsective picture corresponding to the designated region.

To achieve the fifth object, a eighth embodiment of the present invention provides a perspective representation system including a memory means for storing an original picture set consisting of a standard original picture and horizontally contracted, vertically contracted and horizontally and vertically contracted pictures of the standard original picture, the system being operable for editing to display a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters on a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture, wherein the system further includes a display means for displaying the standard original picture and an enclosing frame designating the size of the standard original picture, a means for varying a range of the displayed enclosing frame on the display means in accordance with an external instruction, a calculation means for calculating coordinates of the respective displayable rectangular subregions of a range region of the horizontally contracted original picture corresponding to the range of the enclosing frame, a range region of the vertically contracted original picture corresponding to the range of the enclosing frame and a range region of the vertically contracted original picture corresponding to the range of the enclosing frame, as they are computed based on the contraction ratios and the range of the enclosing frame, and a means responsive to the calculated coordinates for reading from the memory means the rectangular subregion within the range region of the enclosing frame in the standard original picture, the rectangular subregion within the range region of the enclosing frame in the horizontally contracted original picture, the rectangular subregion within the range region of the enclosing frame in the vertically contracted original picture and the rectangular subregion within the range region of the enclosing frame in the horizontally and vertically contracted original picture to edit the perspective picture in correspondece to the range of the enclosing frame.

According to this embodiment of the invention, the system further comprises a designation means for designating the range of the enclosing frame.

To achieve the fifth object, a ninth embodiment of the present invention provides a perspective representation method including the steps of storing an original picture set consisting of a standard original picture and horizontally contracted, vertically contracted and horizontally and vertically contracted pictures of the standard original picture, editing to display a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters on a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture, displaying the standard original picture and an enclosing frame designating the size of the standard original picture, varying a range of the displayed enclosing frame in accordance with an external instruction, calculating coordinates of the respective displayable rectangular subregions of a range region of the horizontally contracted original picture corresponding to the range of the enclosing frame, a range region of the vertically contracted original picture corresponding to the range of the enclosing frame and a range region of the vertically contracted original picture corresponding to the range of the enclosing frame, as they are computed based on the contraction ratios and the range of the enclosing frame, and responding to the calculated coordinates for reading the rectangular subregion within the range region of the enclosing frame in the standard original picture, the rectangular subregion within the range region of the enclosing frame in the horizontally contracted original picture, the rectangular subregion within the range region of the enclosing frame in the vertically contracted original picture and the rectangular subregion within the range region of the enclosing frame in the horizontally and vertically contracted original picture to edit the perspective picture in correspondece to the range of the enclosing frame.

It is a sixth object of the present invention to provide a perspective representation system and a perspective representaion method permitting a concerned point to be followed without missing, even when an input parameter has a significant difference to an employed parameter for a current perspective picture.

To achieve the sixth object, a tenth embodiment of the present invention provides a perspective representation system including a parameter input means for inputting a perspective representation parameter, a medium parameter generation means for generating a medium parameter of a perspective picture, a parameter memory means for storing the perspective representation parameter, a perspective picture generation means for generating the perspective picture, and a picture display means for displaying the perspective picture depending on the perspective representation parameter, wherein the medium parameter generation means provides the perspective picture generation means with a plurality of said medium parameters varying from the stored perspective representation parameter to the input perspective parameter, and stores the perspective representation parameter in the parameter memory means.

According to this embodiment of the invention, the medium parameter generation means provides the perspective picture generation means with a sequence of said medium parameters of which an arbitrary neighboring pair have a constant difference therebetween, varying from the stored perspective representation parameter in the memory means to the input perspective representation parameter.

According to the invention, the medium parameter generation means provides perspective picture generation means with a first sequence of said medium parameters of which an arbitrary neighboring pair have a progressively increasing difference and a second sequence of said medium parameters of which an arbitrary neighboring pair have a progressively decreasing difference, varying from the stored perspective representation parameter in the memory means to the input perspective representation parameter.

According to another aspect of this embodiment of the invention, the perspective picture generation means comprises an original picture memory means for storing a standard original picture, a horizontally contracted original picture, a vertically contracted original picture and a horizontally and vertically contracted original picture, a displayable picture memory means for storing a generated perspective picture, an image reproduction means for executing a reproduction of partial images of the stored pictures in the original picture memory means to the displayable picture memory means and a reproduction of a partial image of the stored picture in the displayable picture memory means to the displayable picture memory means, a medium parameter memory means for storing perspective representation parameters corresponding to the perspective picture stored in the displayable picture memory means, and a perspective representation control means responsive to the perspective representation parameters input from the medium parameter generation means and the perspective representation parameters stored in the medium parameter memory means for determining, for each subregion divided by separation lines of the perspective picture based on the perspective representation parameters input from the medium parameter generation means, a reusable subregion and an unreusable subregion of the perspective picture in the displayable picture memory means for editing an image of said each subregion, and for instructing the image reproduction means to designate, for a reproduction of the reusable subregion, a region of the displayable picture memory means for the reproduction therefrom and a region of the displayable picture memory means for the reproduction thereonto and, for a reproduction of the unreusable subregion, a region of the original picture memory means for the reproduction therefrom and a region of the displayable picture memory means for the reproduction thereonto, before storing the input perspective representation paramters from the medium parameter generation means into the medium parameter memory means.

To achieve the sixth object, a eleventh embodiment of the present invention provides a perspective representation method comprising the steps of inputting a perspective representation parameter, generating a medium parameter of a perspective picture, storing the perspective representation parameter, generating the perspective picture, displaying the perspective picture depending on the perspective representation parameter, providing a plurality of said medium parameters varying from the stored perspective representation parameter to the input perspective parameter, and storing the perspective representation parameter.

BRIEF DESCRIPTION OF THE DRAWINGS

The objects, features and advantages of the present invention will become more apparent from consideration of the following detailed description, in conjunction with the accompanying drawings, in which:

FIG. 1 is an illustration of a principle of a known perspective representation;

FIGS. 24A and 24B are illustrations of a perspective picture and four original pictures generated in the system of FIG. 22 and employable in the systems of FIGS. 12, 15, 19 and 25, respectively;

FIG. 30 is a block diagram of a perspective representation system according to an embodiment of the invention;

DESCRIPTION OF THE PREFERRED EMBODIMENTS

There will be detailed below preferred embodiments of the present invention, with reference to the accompanying drawings.

Figure 4:
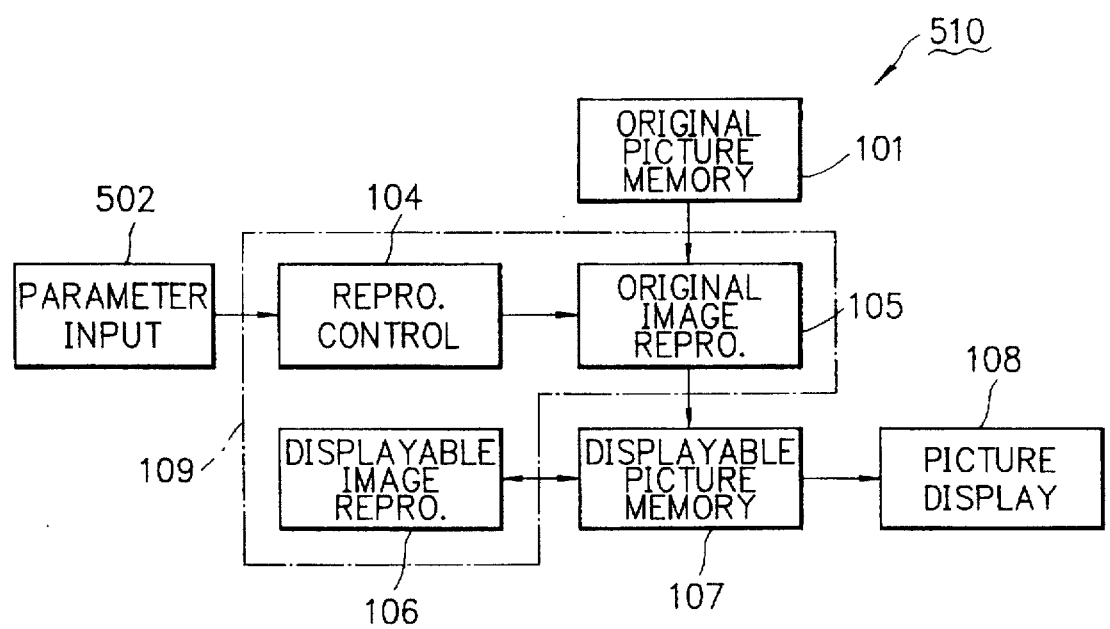
FIG. 4 is a block diagram of a perspective representation system according to an embodiment of the invention.

FIG. 4 is a block diagram of a perspective representation system according to an embodiment of the present invention.

In FIG. 4, designated at reference character 510 is the perspective representation system. The system 510 comprises an original picture memory means 101 for storing an original picture, a displayable picture memory means 107 for storing a displayable picture, a picture reproduction means 109 for reproducing the original picture in the displayable picture, a parameter input means 502 for receiving image reproduction parameters, and a picture display means 108 for visualizing the displayable picture.

The picture reproduction means 109 comprises an original picture reproduction means 105 for reproducing a partial image of a picture stored in the original picture memory means, a displayable picture reproduction means 106 for reproducing a partial image of the displayable picture in the displayable picture, and a reproduciton control means 104 responsible for among the picture reproduction parameters a designation of a rectangular partial region of the original picture to be reproduced, a designation of a rectangular partial region of the displayable picture at the reproduction end, and information on a correspondence relationship between the displayable picture and the original picture that an image of a certain region of the displayable picture and an image of a certain region of the original picture are equivalent to each other, to instruct the displayable picture reproduction means 106 for a reproduction to reuse part of the displayable picture, as it is reusable as part of the region at the reproduction end, and to reproduce from the original picture a region at the reproduction end insufficient of the reuse of the displayable picture.

Figure 5:
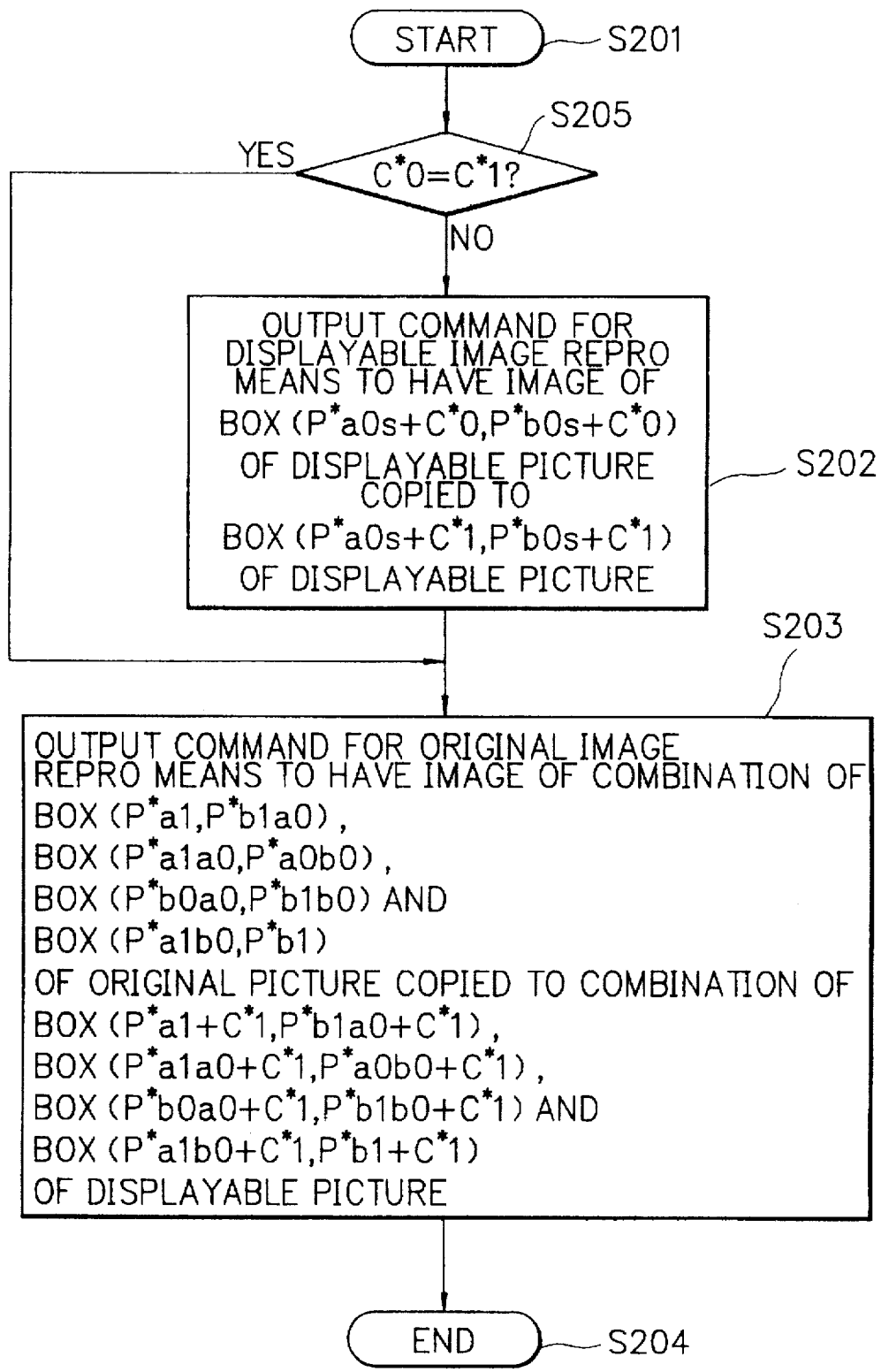
FIG. 5 is a flow chart of actions of the system of FIG. 4.

FIG. 5 is a flow chart of actions of the system of FIG. 4.

An instruction COPY 1 [P*a1, P*b1, Q*a1, P*a0, P*b0, Q*a0] means "Copy an image of BOX[P*a1, P*b1] of an original picture to BOX[Q*a1, Q*a1+P*b1−P*a1] of a displayable picture, providing that the image of BOX[P*a0, P*b0] of the original picture is equivalent to an image of BOX[Q*a0, Q*a0+P*b0−P*a0] of the displayable picture", where P*a1, P*b1, Q*a1, P*a0, P*b0, Q*a0 are image reproduction parameters. FIG. 5 is a flow chart of control actions of the reproduction control means 104 when the instruction COPY 1 [P*a1, P*b1, Q*a1, P*a0, P*b0, Q*a0] is input from the parameter input means 502, providing that:

C*0=Q*a0−P*a0

C*1=Q*a1−P*a1

P*a0s=SAT(P*a1, P*a0, P*b1)

P*b0s=SAT(P*a1, P*b0, P*b1)

P*b1a0=XY(P*b1, P*a0s)

P*a1b0=XY(P*a1, P*a0s)

P*a0b0=XY(P*a0s, P*b0s)

P*b0a0=XY(P*b0s, P*a0s)

P*b1b0=XY(P*b1, P*b0s)

P*a1b0=XY(P*a1, P*b0s), where SAS is a function such that:

SAT((X₁, Y₁), (X, Y), (X₂, Y₂))=(MAX(X₁, MIN(X, X₂), MAX(Y₁, MIN(Y, Y₂)))

MIN(X₁, X₂)=X₁ (X₁≦X₂) or X₂ (X₁>X₂)

MAX(X₁, X₂)=X₁ (X₁≧X₂) or X₂ (X₁<X₂).

Figure 6:
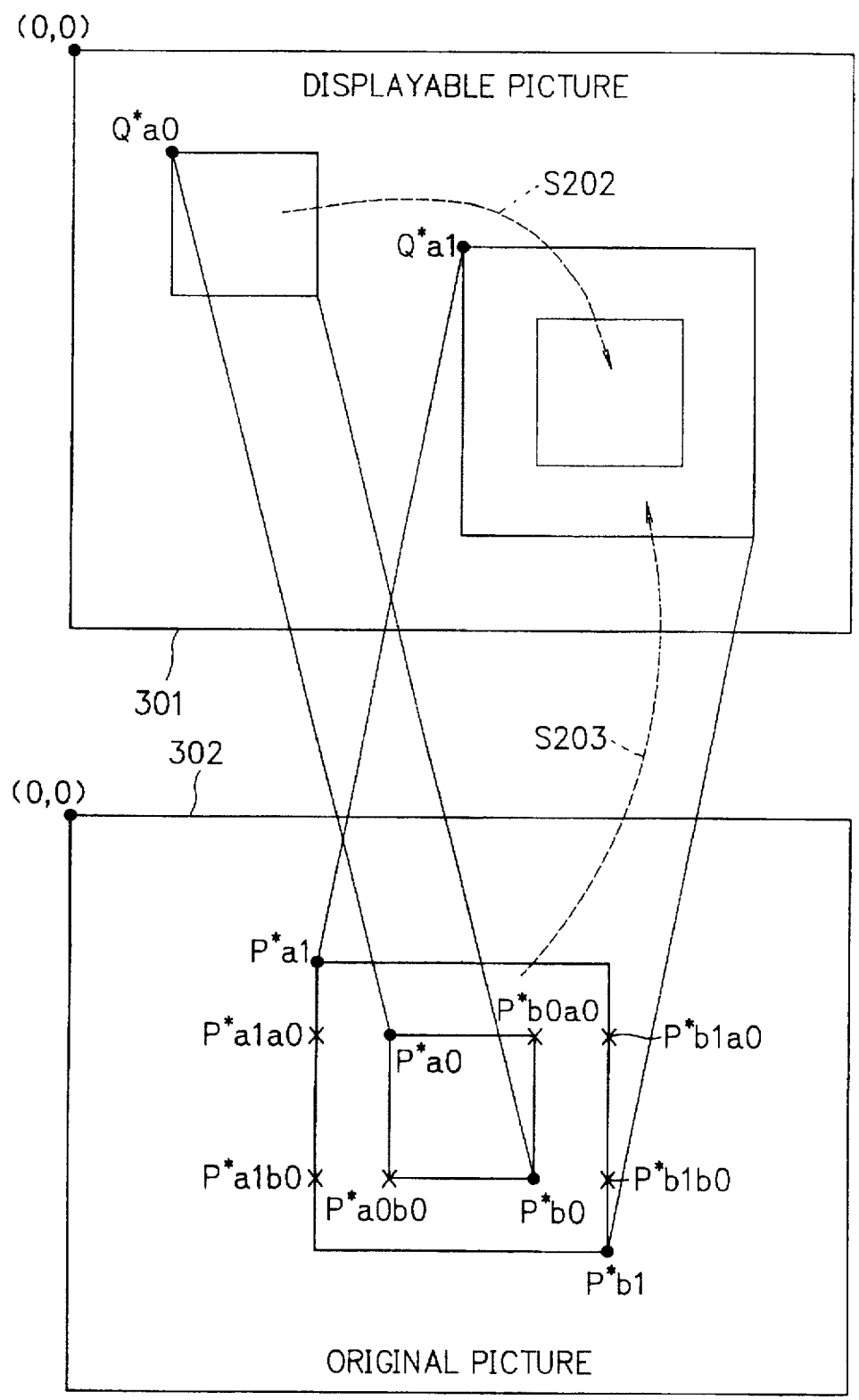
FIGS. 6 and 7 are illustrations describing actions in the flow chart of FIG. 5.
Figure 7:
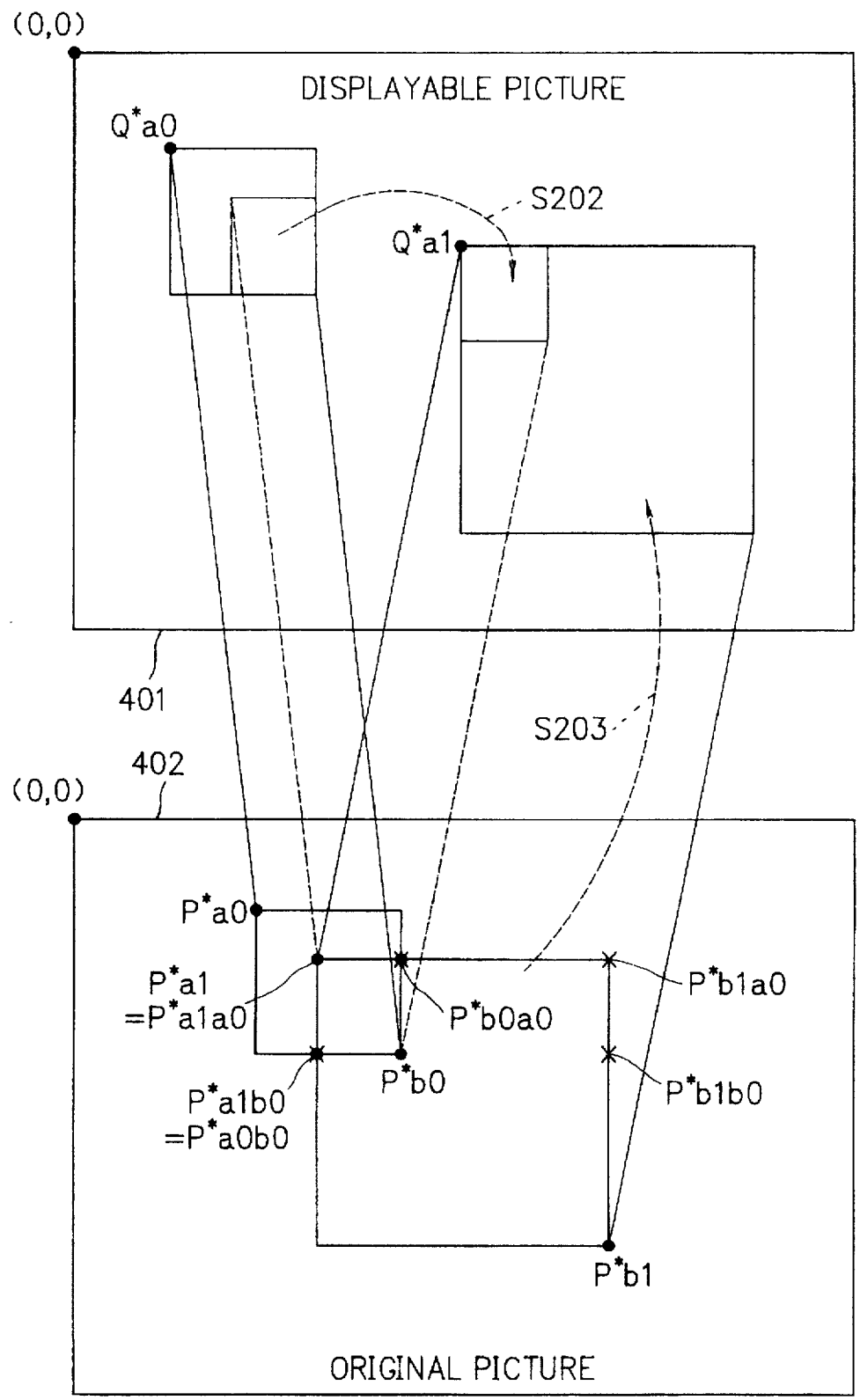

FIGS. 6 and 7 illustrate a reproduction process by steps S203 and S203, as the instruction COPY 1 [P*a1, P*b1, Q*a1, P*a0, P*b0, Q*a0] is given to the reproduction control means 104, as P*a1, P*b1, Q*a1, P*a0, P*b0, Q*a0 are shown by solid circles.

Figure 8:
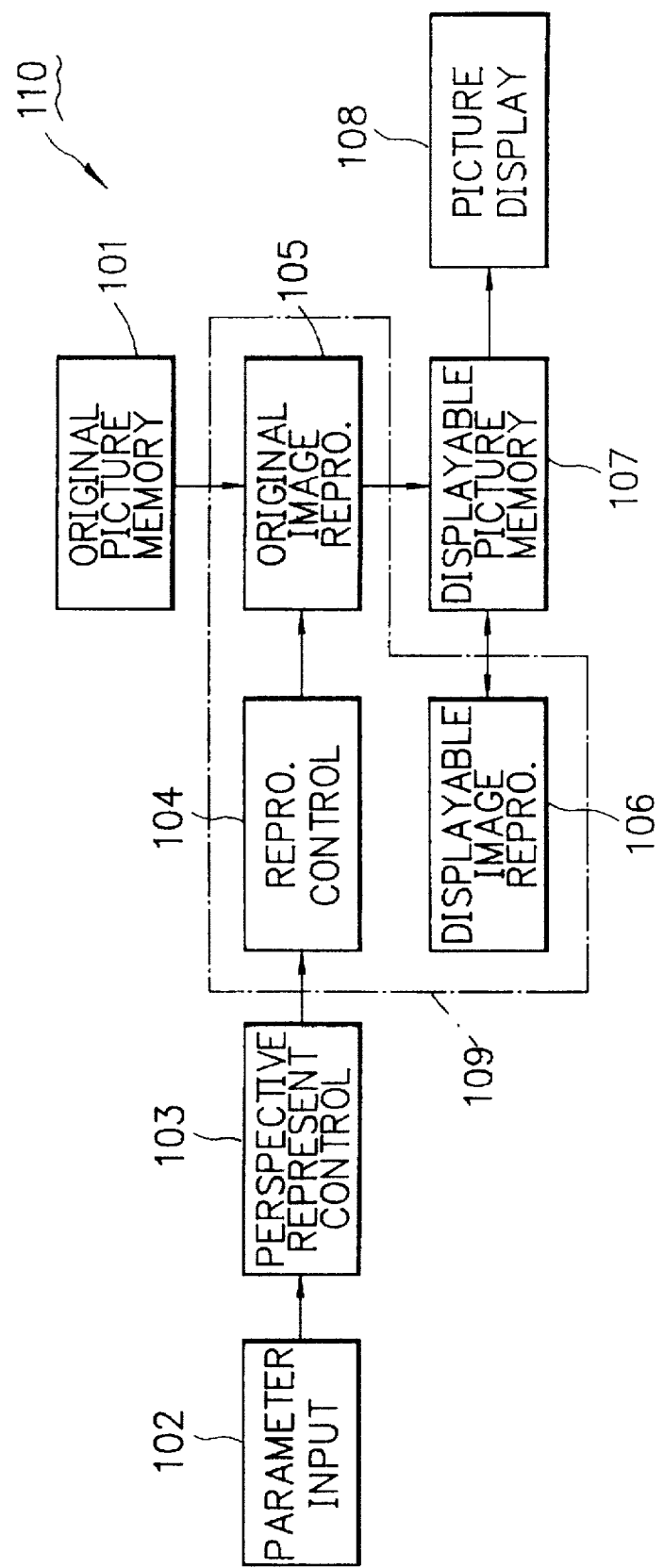
FIG. 8 is a block diagram of a perspective representation system according to another embodiment of the invention.

FIG. 8 is a block diagram of a perspective representation system according to another embodiment of the present invention.

In FIG. 8, designated at reference character 110 is the perspective representation system. The system 110 comprises an original picture memory means 101 for storing an original picture, a displayable picture memory means 107 for storing a displayable picture, a picture reproduction means 109 for reproducing the original picture in the displayable picture, a parameter input means 102 for receiving image reproduction parameters, and a picture display means 108 for visualizing the displayable picture.

Therefore, the system 110 includes the system 710, as its picture reproduction means 705 is replaced by the picture reproduction means 109 of the system 510. When parameter is updated, the perspective representation control means 103 controls the system so that the reproduction means 109 of the system 510 acts on respective rectangular regions of a perspective picutre.

Figure 2:
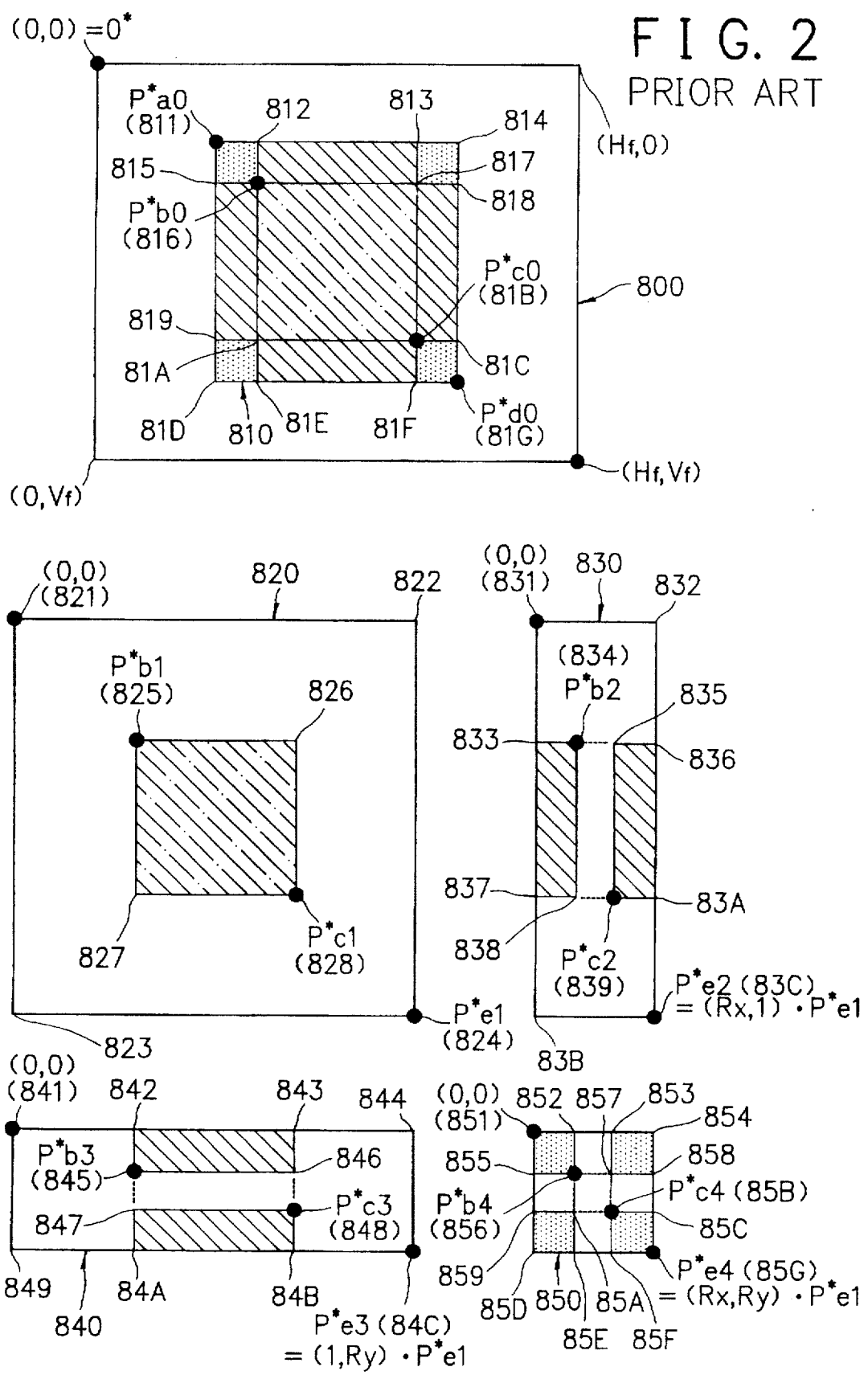
FIG. 2 is an illustration for an analytical expression of the perspective representation of FIG. 1.
Figure 3:
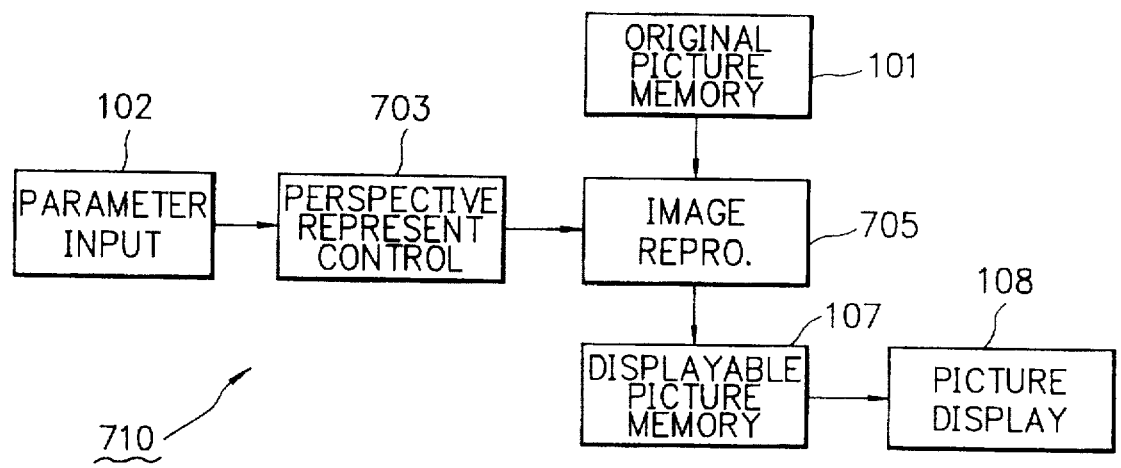
FIG. 3 is a block diagram of a conventional perspective representation system.

For the picture reproduction means 109, an instruction COPY 2 [picture X, P*a1, P*b1, Q*a1, P*a0, P*b0, Q*a0] means "Copy an image of BOX[P*a1, P*b1] of an original picture to BOX[Q*a1, Q*a1+P*b1−P*a1] of a displayable picture, providing that the image of BOX[P*a0, P*b0] of the original picture is equivalent to an image of BOX[Q*a0, Q*a0+P*b0−P*a0] of the displayable picture", where X, P*a1, P*b1, Q*a1, P*a0, P*b0, Q*a0 are image reproduction parameters. Perpective picture parameters are P*a0, P*b0, P*c0, P*d0, P*b1, P*c1, P*b2, P*c2, P*b3, P*c3, P*b4, P*c4, as shown in FIG. 2. These parameters are all given by the parameter input means or in part, as other values are adequately set in accordance with perpective representation conditions, so that they are changed from P*a0, P*b0, P*c0, P*d0, P*b1, P*c1, P*b2, P*c2, P*b3, P*c3, P*b4, P*c4 to Q*a0, Q*b0, Q*c0, Q*d0, Q*b1, Q*c1, Q*b2, Q*c2, Q*b3, Q*c3, Q*b4, Q*c4, of which a process flow is shown in FIG. 9.

Figure 9:
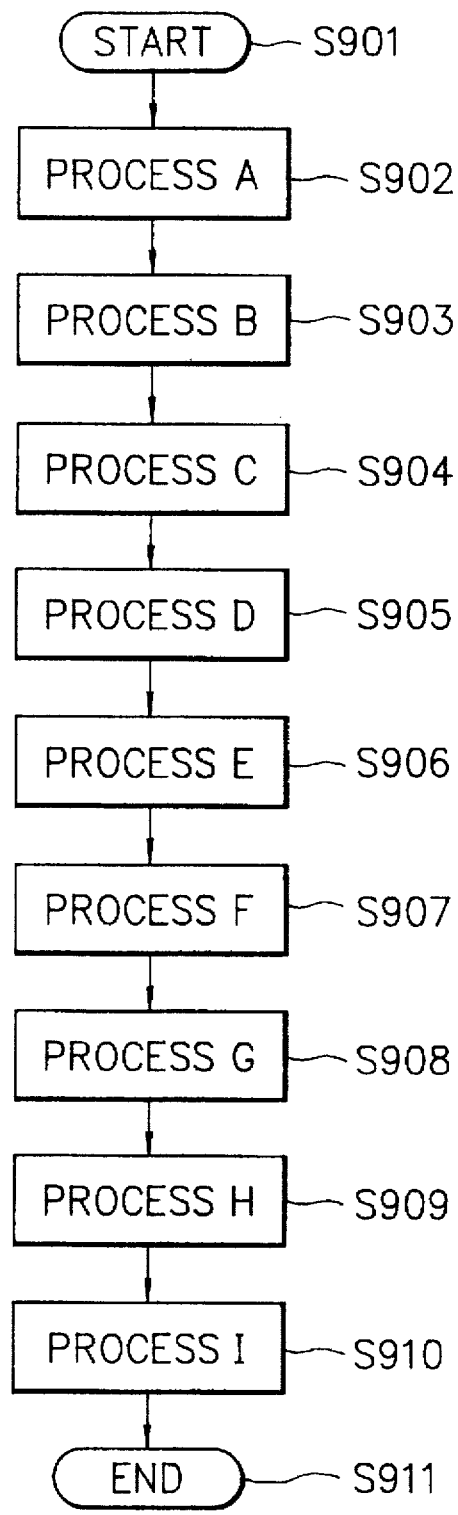
FIG. 9 is a flow chart of processes in the system of FIG. 8.

In FIG. 9, processes A, B, C, D, E, F, G, H, I are instructions to the picture reproduction means, such that A: COPY 2 [horizontally and vertically contracted original picture, 0*, Q*b4, Q*a0, 0*, P*b4, P*a0], B: COPY 2 [vertically contracted original picture, XY(0*b3, 0*), XY(Q*c3, Q*b3), XY(Q*b0, Q*a0), XY(P*b3, 0*), XY(P*c3, P*b3), XY(P*b0, P*a0)], C: COPY 2 [horizontally and vertically contracted original picture, XY(Q*c4, 0*), XY(Q*e4, Q*b4), XY(Q*c0, Q*a0), XY(P*b3, 0*), XY(P*c4, 0*), XY(P*e4, P*b4), XY(P*c0, P*a0)], D: COPY 2 [horizontally contracted original picture, XY(0*, Q*b2), XY(Q*b2, Q*c2), XY(Q*a0, Q*b0), XY(0*, P*b2), XY(P*b2, P*c2), XY(P*a0, P*b0)].

E: COPY 2 [standard original picture, Q*b1, Q*c1, Q*b0, P*b1, P*c1, P*b0],

F: COPY 2 [vertically contracted original picture, XY(Q*c2, Q*b2), XY(Q*e2, Q*c2), XY(Q*c0, Q*b0), XY(P c2, P*b2), XY(P*e2, P*c2), XY(P*c0, P*b0)].

G: COPY 2 [horizontally contracted original picture, XY(0*, Q*e4), XY(Q*b4, Q*e4), XY(Q*a0, Q*c0), XY(0*, P*c4), XY(P*b4, P*e4), XY(P*b4, P*e4), XY(P*a0, P*c0) ], H: COPY 2 [vertically contracted original picture, XY(Q*b3, Q*c3), XY(Q*c3, Q*e3), XY(Q*b0, Q*c0), XY(P*b3, P*c3), XY(P*c3, P*e3), XY(P*b0, P*e0)], I: COPY 2 [horizontally and vertically contracted original picture, Q*c4, Q*e4, Q*c0, Q*c4, P*e4, P*c0].

The foregoing processes A to I are for copying partial regions A to I corresponding to ① to ⑨ of the perspective picture 810 onto the displayable picture 800.

This copying is executed in accordance with the procedure COPY2 in which, if a necessary partial image present on the displayable picture 800 is in a memory (=VRAM), it is reused by copying within the memory or the like, while other necessary partial images are brought about from the original picture memory.

The copying inside a VRAM, which usually is executed by a dedicated processor or the like, affords a higher speed than copying data from an original picture which is assumed to be stored in a main memory.

It however may take time to concurrently check for a necessary region on the displayable picture. Therefore, the COPY2 itself is free from such a check, but employs therefor the last three of the seven variables.

For a given value for each of the three variables, there are stored results of a previous COPY2 process.

In the present embodiment, description is made of a state when a value set Pxx is changed to a value set Qxx, of which elements are thus employed for the variables, as will be seen from the fifth, sixth and seventh variables of the COPY2 which are always a combination of Pxx.

Figure 10:
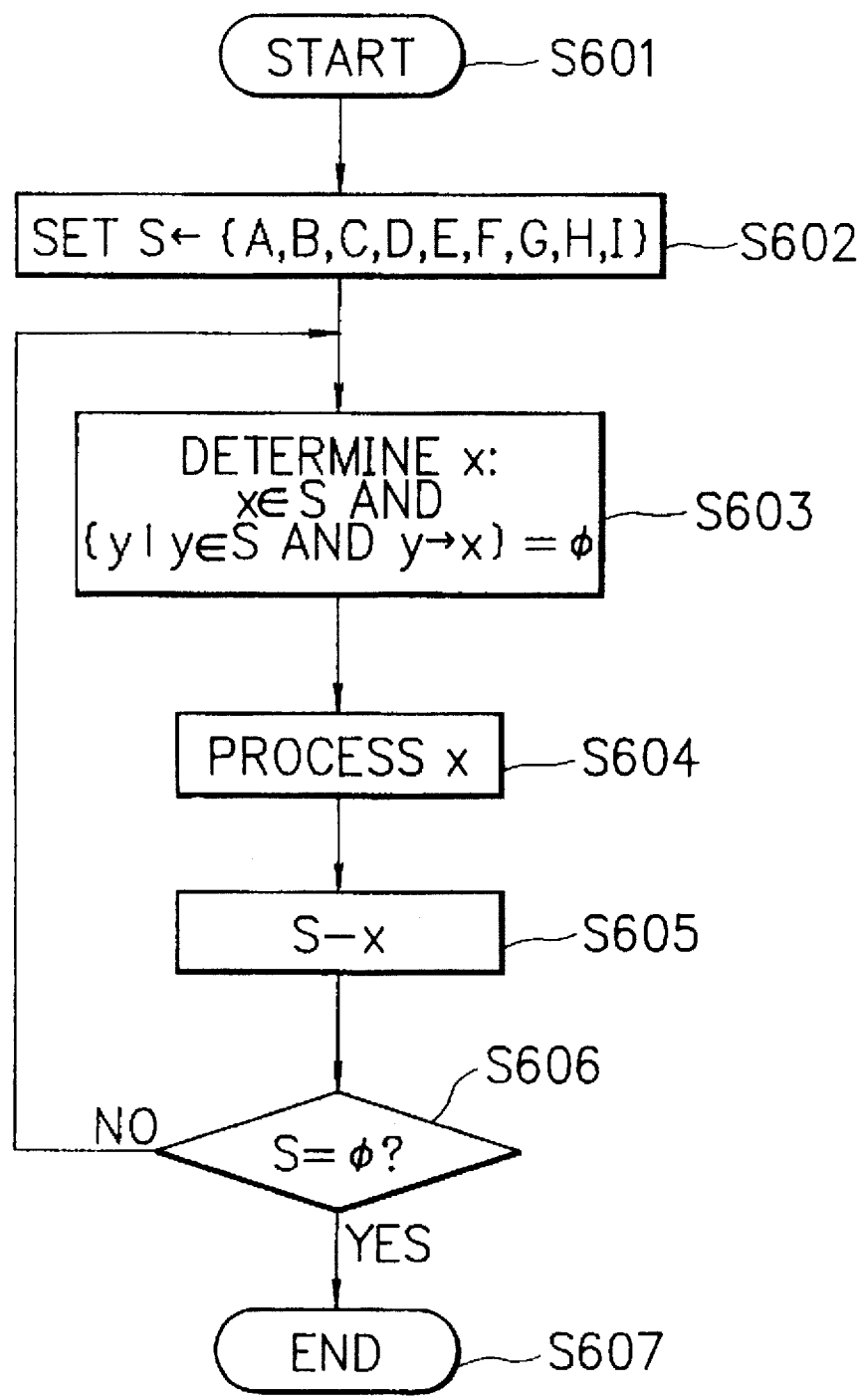
FIG. 10 is a flow chart for describing a modification of the embodiment shown in FIG. 8.

In the system 110, the process by the control means 103 when the perspective representation parameters are updated may be modified in accordance with the process of FIG. 5, as shown in FIG. 10.

In this embodiment also, an intra-VRAM copy is partially employed for generating a perspective picture.

Accordingly, a simple copying without attentions to an order of processes may have an undesirable result such that a partial image to be reused might have already been overwritten. To avoid such an undesirable overwrite operation, there will be given below a sufficient condition for defining an order of the processes A to I.

In FIG. 10, "→" at a step S603 means a semiorder between elements of S, such that:

A→B, D→E, G→H (SX(Q*b0−P*b0)<0)

B→A, E→D, H→G (SX(Q*b0−P*b0)>0);

B→C, E→F, H→I (SX(Q*c0−P*c0)<0)

C→B, F→E, I→H (SX(Q*c0−P*c0)>0);

A→D, B→E, C→F (SY(Q*b0−P*b0)<0)

D→A, E→B, F→C (SY(Q*b0−P*b0)>0);

D→G, E→H, F→I (SY(Q*c0−P*c0)<0)

G→D, H→E, I→F (SY(Q*c0−P*c0)>0), where SX and SY are functions such that:

SX((X,Y))=X and SY((X,Y))=Y,
respectively.

The perspective picture 810 is divided into three rows by three columns of subregions defined by four line segments passing P*b0 or P*c0. Such line segments may be moved, when the perspective representation parameters are updated. When a line segment moves, neighboring subregions at both sides thereof are reproduced in an order defined by the semiorder described.

For example, if SX(Q*b0−P*b0)<0, a vertical line segment passing a point P*b0 moves in a leftward direction, whereas the process A precedes process B, the process D precedes process E, and the process G precedes process H.

At the step S604, process X means one of the processes A to I.

It will be seen that e.g. the fifth expression A→D, B→E, C→F (SY(Q*b0−P*b0)<0) means that, when a horizontal boundary line between regions A,B,C (corresponding to ①②③) and D,E,F (corresponding to ④⑤⑥) moves upwardly, the processes A, B and C shall be executed with a priority to the processes D, E and F, respectively.

Providing the semiorders defined above, the processes A to I may be executed in parallel.

In FIG. 10, the processes A to I are serially executed by deducing a full-order from a set of semiorders.

Figure 21:
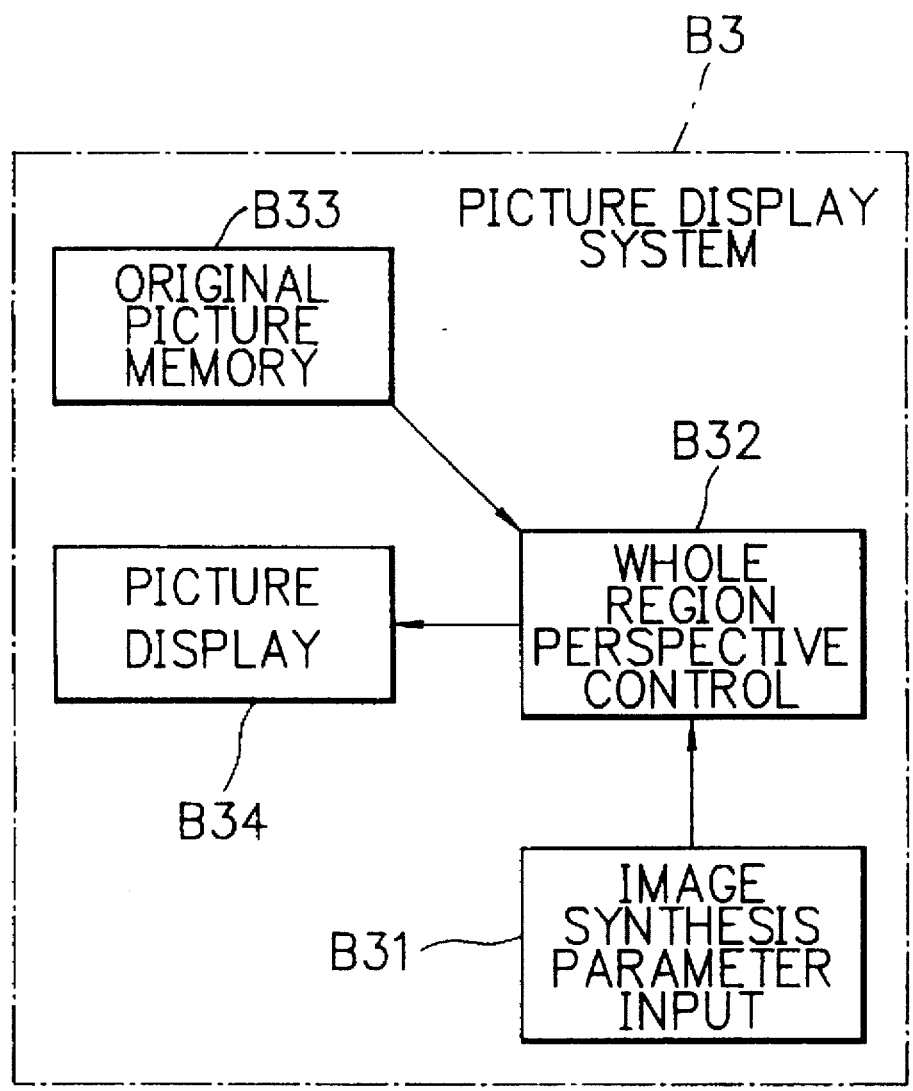
FIG. 21 is a block diagram of a perspective representation system according to an embodiment of the invention.

FIG. 21 is a block diagram of a picture display system B3 as a picture editor according to an embodiment of the present invention.

The picture display system B3 comprises an image synthesis parameter input section B31, a whole region perspective representation controller B32, an original picture memory B33 and a picture display B34.

The original picture memory A103 has stored therein a standard original picture, a horizontally contracted picture of the standard original picture, a vertically contracted picture of the standard original picture, and a horizontally and vertically contracted picture of the standard original picture.

The perspective representation controller B32 edits a perspective picture by copying a central subregion of the standard original picture, right and left subregions of the horizontally contracted picture, upper and lower subregions of the vertically contracted picture, and four cornered regions of the horizontally and vertically contracted picture.

The parameter input section B31 inputs size paramter values.

Such the arrangement is known. However, though unshown, the controller B32 includes a reproduction control means, an original image reproduction means, a displayable image reproduction means and a displayable picture memory means, like perspective representation controllers in later-described systems in conjunction with FIGS. 22 and 25.

Moreover, the picture display system B3 may be put under control of the cooperation controller A3 of FIG. 12, like later-described systems in conjunction with FIGS. 22 and 25.

Figure 11:
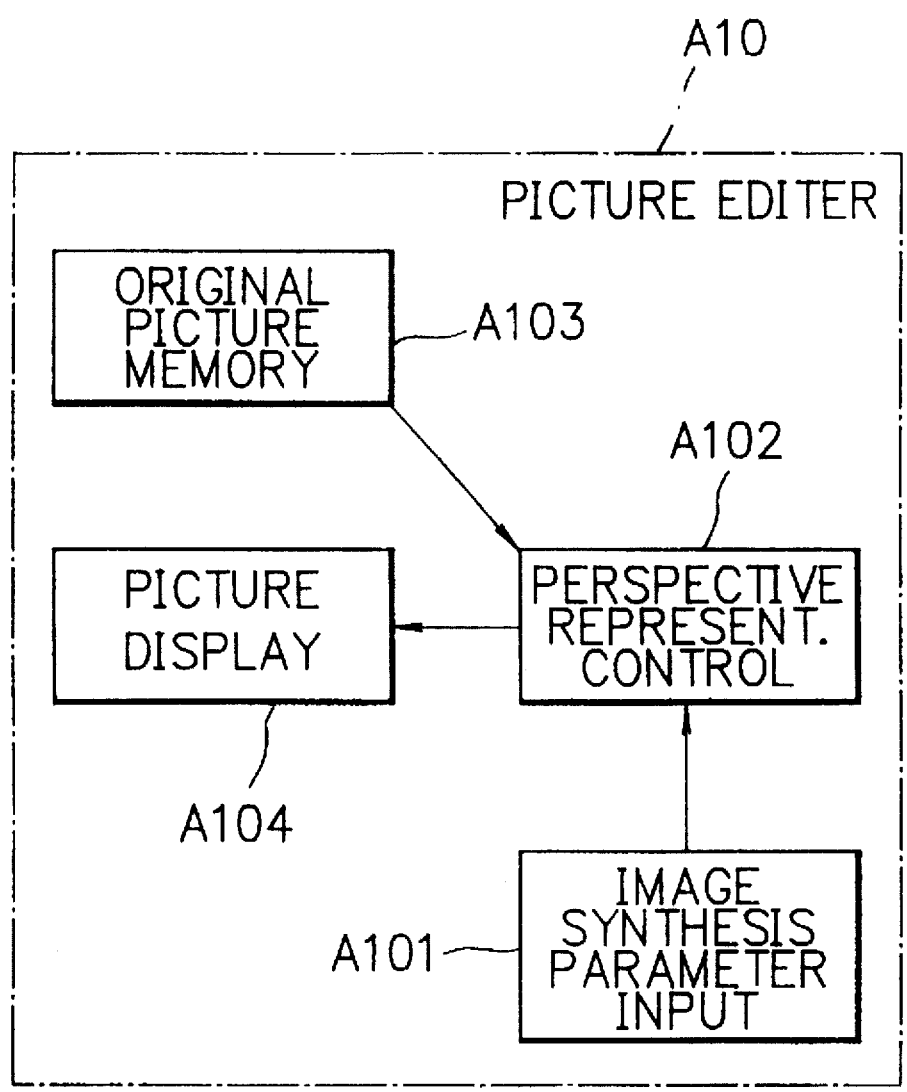
FIG. 11 is a block diagram of a picture editor according to an embodiment of the invention.
Figure 12:
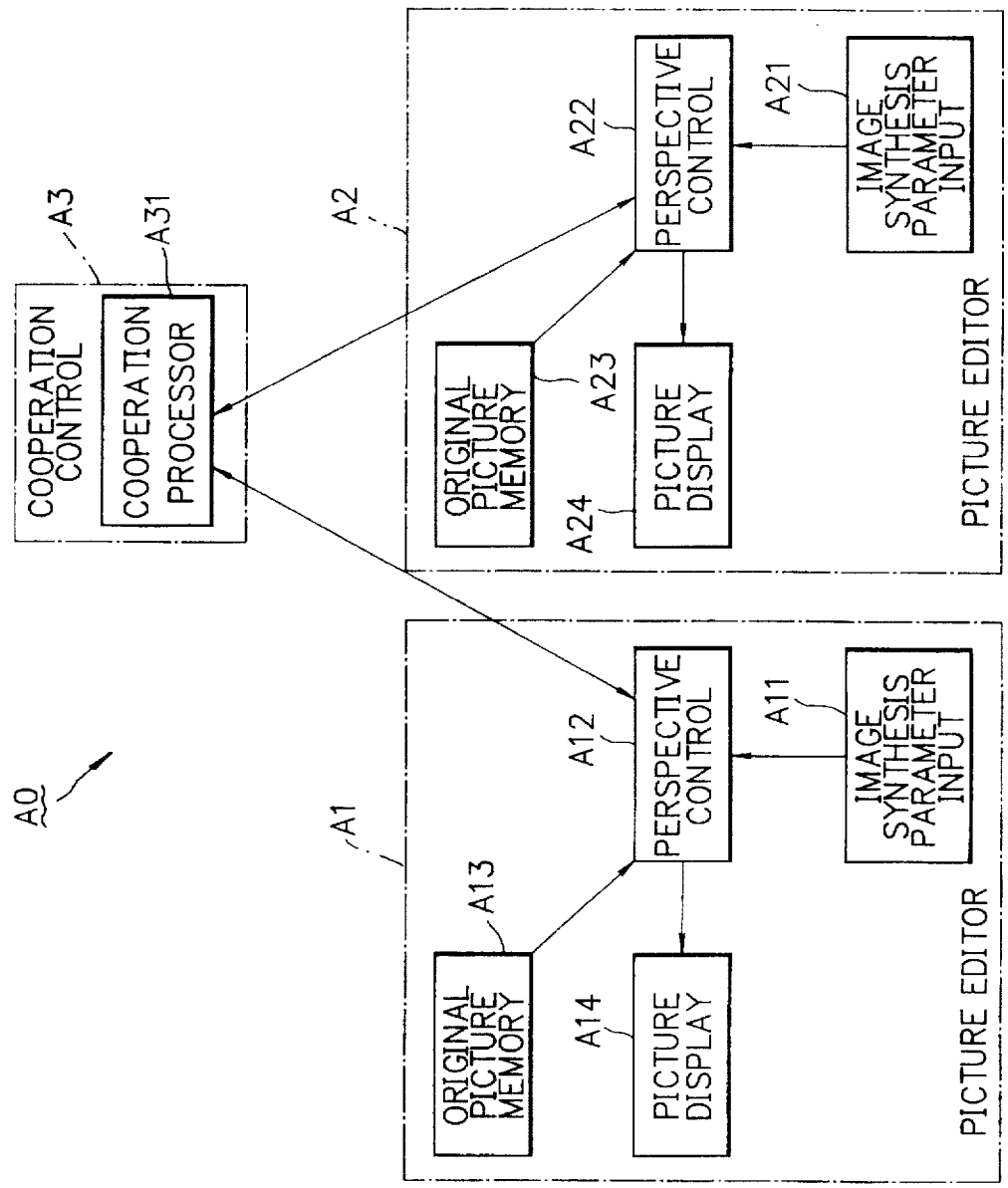
FIG. 12 is a block diagram of a perspective representation system according to an embodiment of the invention.

FIG. 11 illustrates a picture editor A10 that corresponds to A1, A2 of FIG. 12. In FIG. 11, there is shown a picture editor A10, including an image synthesis parameter input A101, whose output is provided to a perspective representative control A102. An original picture memory A103 also provides an output to the perspective representative control A102. The output of the perspective representative control A102 is provided to a picture display A104.

FIG. 12 is a block diagram of a system A0 constituting one embodiment according to the present invention. Referring to FIG. 12, there is shown picture editors A1, A2 coupled to a cooperation processor A31 of the cooperation control A3. Each of the editors A1, A2 are similarly configured, and similar to the picture editor A10 illustrated in FIG. 11. Specifically, each of the picture editors A1, A2 includes an image synthesis parameter input A11, A21, a perspective control A12, A22, original picture memory A13, A23, and picture display A14, A24. The cooperation processor A31 of the cooperation control A3 is coupled to the perspective control A12 of the editor A1 and perspective control A22 of the editor A2.

Figure 13:
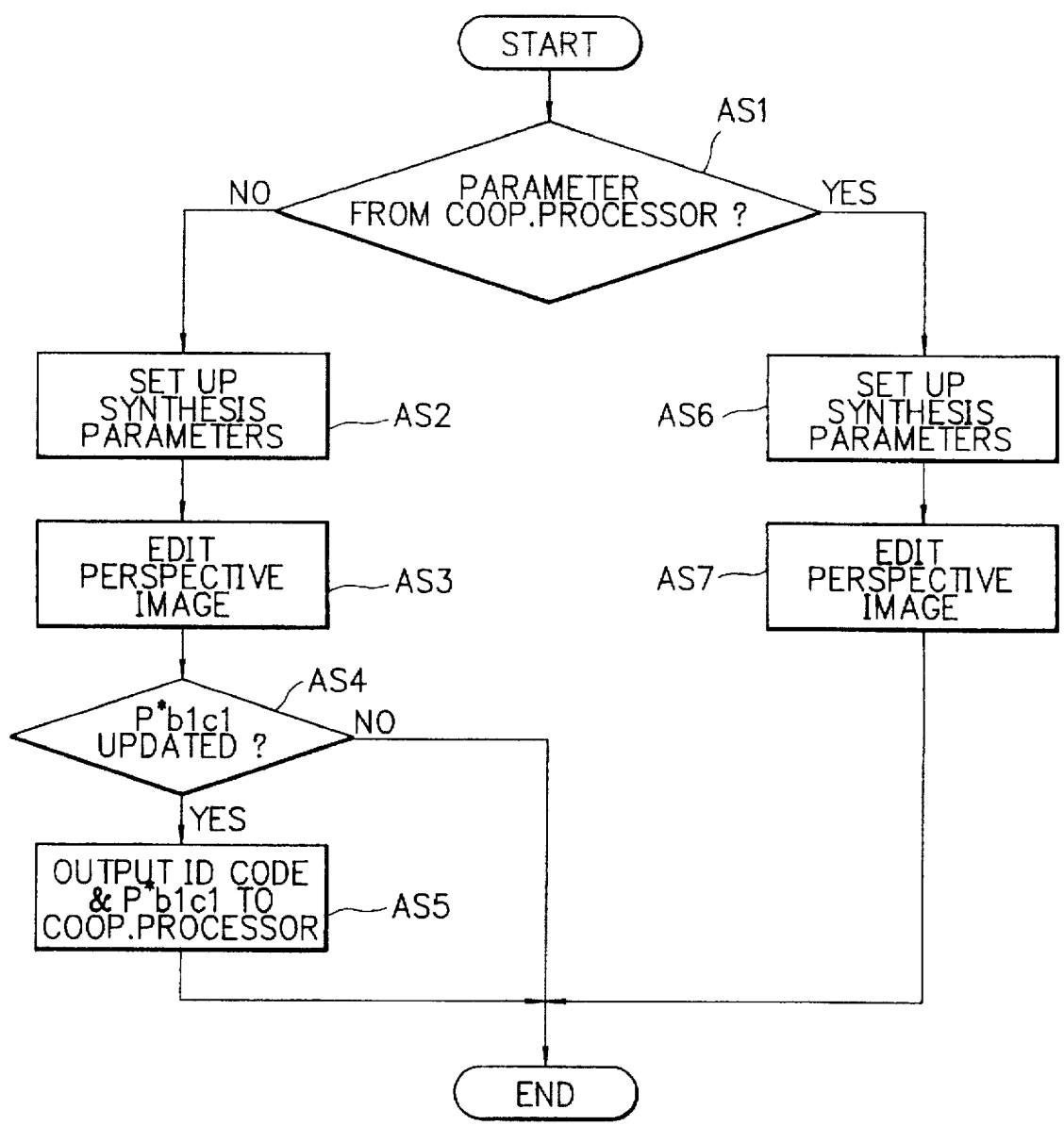
FIG. 13 is a flow chart of actions of a perspective representation controller in the system of FIG. 12.

FIG. 13 is a flow chart showing the operation of perspective controls A12, A22 of the respective picture editors A1, A2 of FIG. 12. Specifically, a first step AS1 is to determine whether there is a parameter from the cooperation processor. If the determination is negative, then in step AS2 synthesis parameters are set up, and in step AS3 the perspective image is edited. In step AS4, a determination is made as to whether P*b1c1 is updated. If not, the process ends, otherwise, the output ID code and P*b1c1 are provided to the cooperation processor in step AS5. If, in step AS1, the determination is positive, then the synthesis parameters are set up in step AS6, and the perspective image is edited in AS7.

Figure 14:
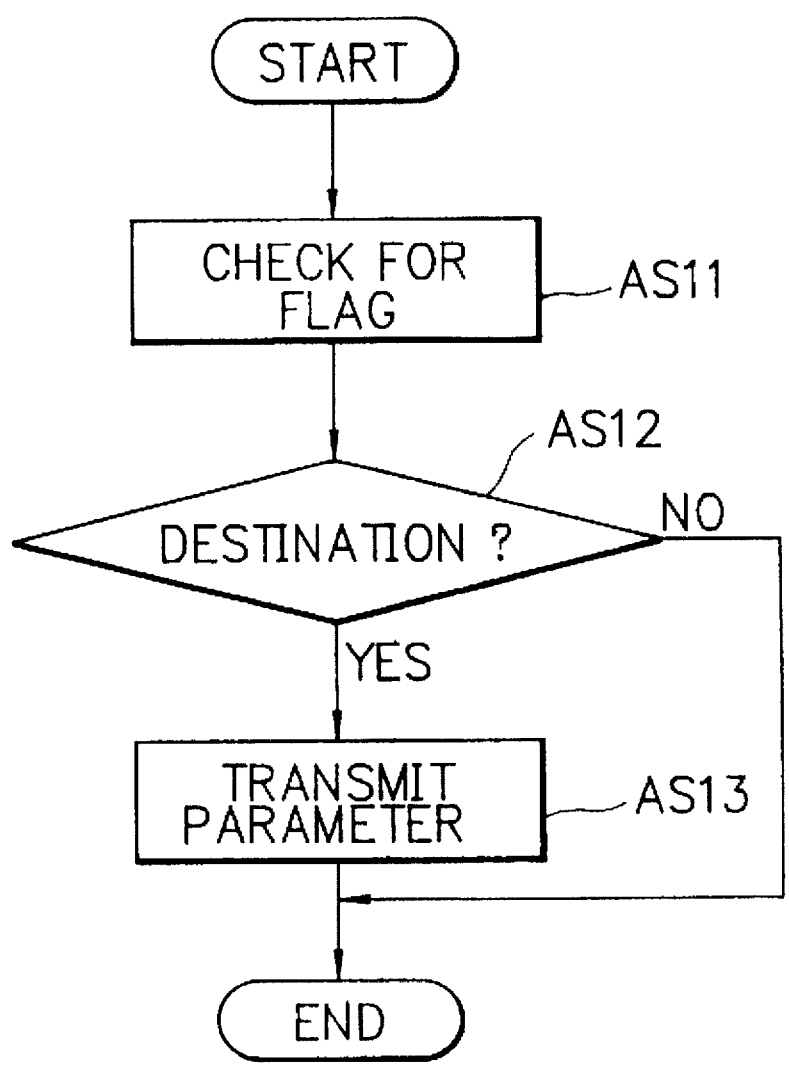
FIG. 14 is a flow chart of actions of a cooperation processor in the system of FIG. 12.

FIG. 14 illustrates a flow chart showing operation of the cooperation processor A31 of the cooperation control A3 illustrated in FIG. 12. In this process, a flag is first checked in step AS11. In step AS12, a determination is made as to whether the destination is present. If so, then the parameters are transmitted in step AS13, otherwise, the process ends.

Figure 15:
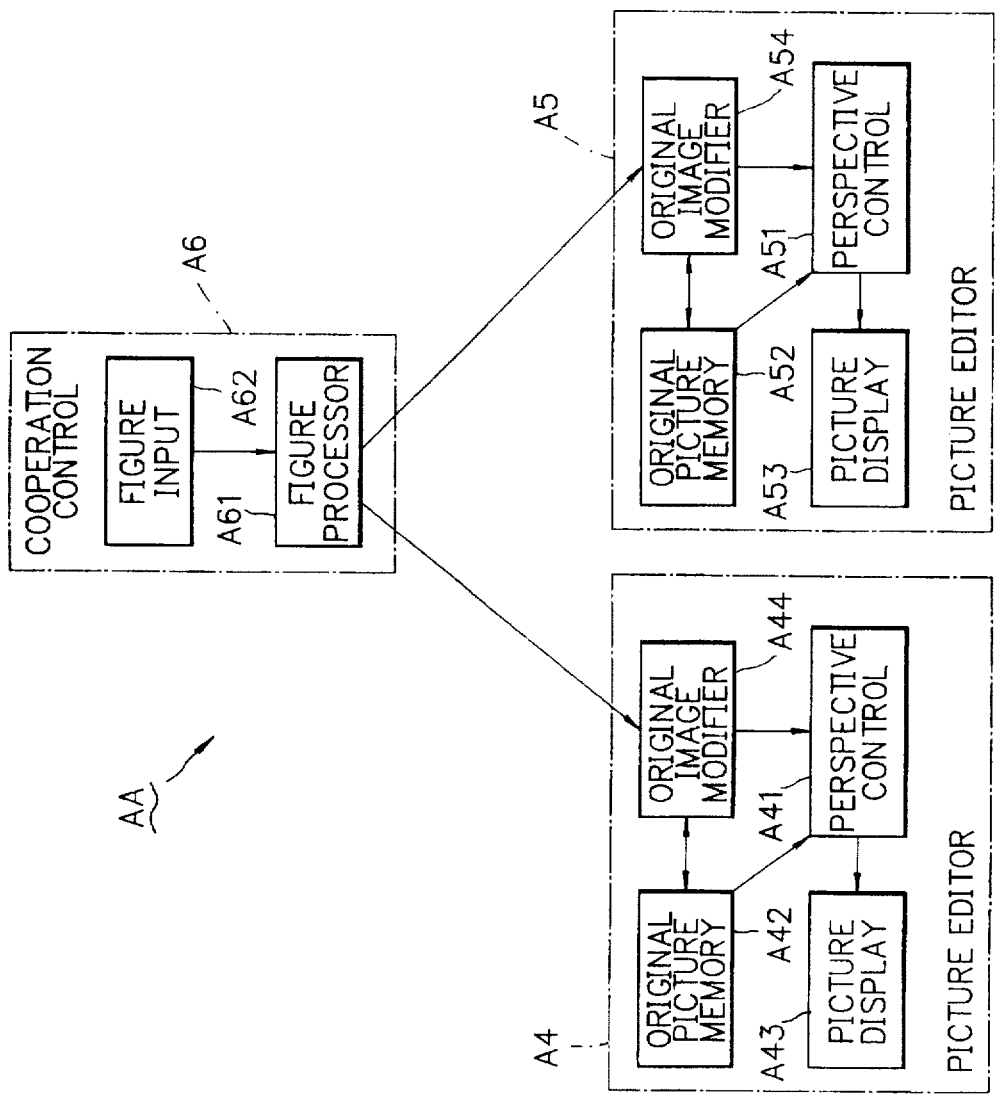
FIG. 15 is a block diagram of a perspective representation system according to an embodiment of the invention.

FIG. 15 illustrates another block diagram showing the construction of a further embodiment of the present invention. The picture processing system AA of FIG. 15 includes picture processing units A4, A5 for forming perspective images indicated in the monitor display, and cooperation control A6. Each of the picture processing editors A4, A5 are similarly configured to include a perspective control A41, A51, an original picture memory A42, A52, an original image modifier A44, A54, and a picture display A43, A53. The processors A4, A5 are coupled to the figure processor A61 of the cooperation control A6, which receives input from a figure input A62.

Figure 16:
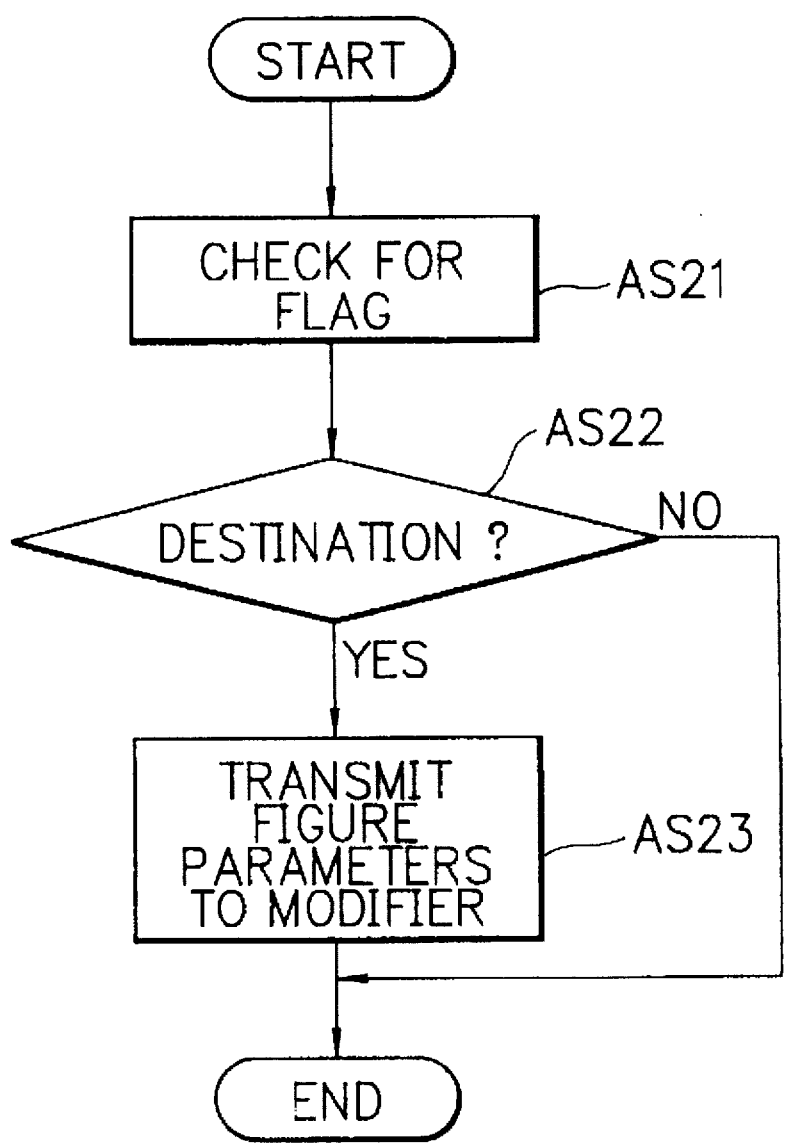
FIG. 16 is a flow chart of actions of a figure processor in the system of FIG. 15.

FIG. 16 illustrates a flow chart showing the operation of the figure processor A61 of the cooperation control A6 of FIG. 15. In step AS21, a first determination is made as to whether a flag is present. In step AS22, there is a determination as to whether the destination is defined. If the answer is yes, then in step AS23 the figure parameters are transmitted to the modifier, otherwise, the process ends.

Figure 17:
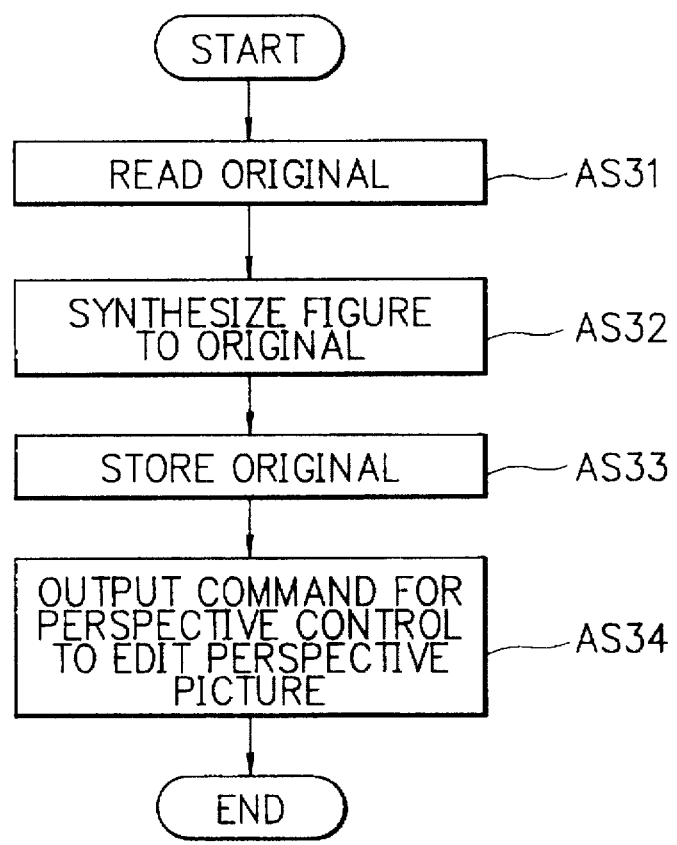
FIG. 17 is a flow chart of actions of an original image modifier in the system of FIG. 15.

FIG. 17 illustrates a flow chart showing the operation of the original image modifiers A44, A54 of the respective picture editors A4, A5 of FIG. 15. Referring to FIG. 17, the first step AS31 includes reading the original picture from memory. In step AS32, the figure is synthesized to the original, and then stored in step AS33. In step AS34, an output command is provided for the perspective control to edit perspective pictures.

Figure 18:
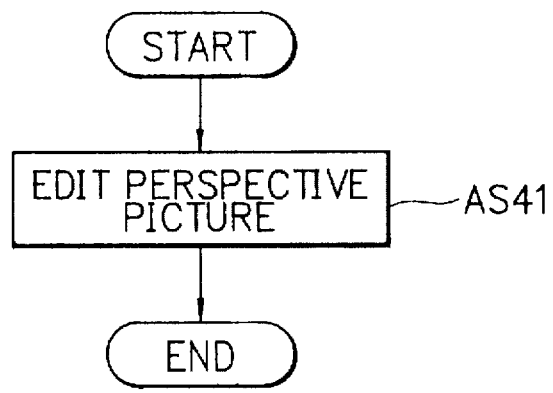
FIG. 18 is a flow chart of actions of a perspective representation controller in the system of FIG. 15.

FIG. 18 illustrates a flow chart showing operation of perspective controls A41, A51 of FIG. 15. This flow chart requires the editing of the perspective picture in step AS41.

Figure 19:
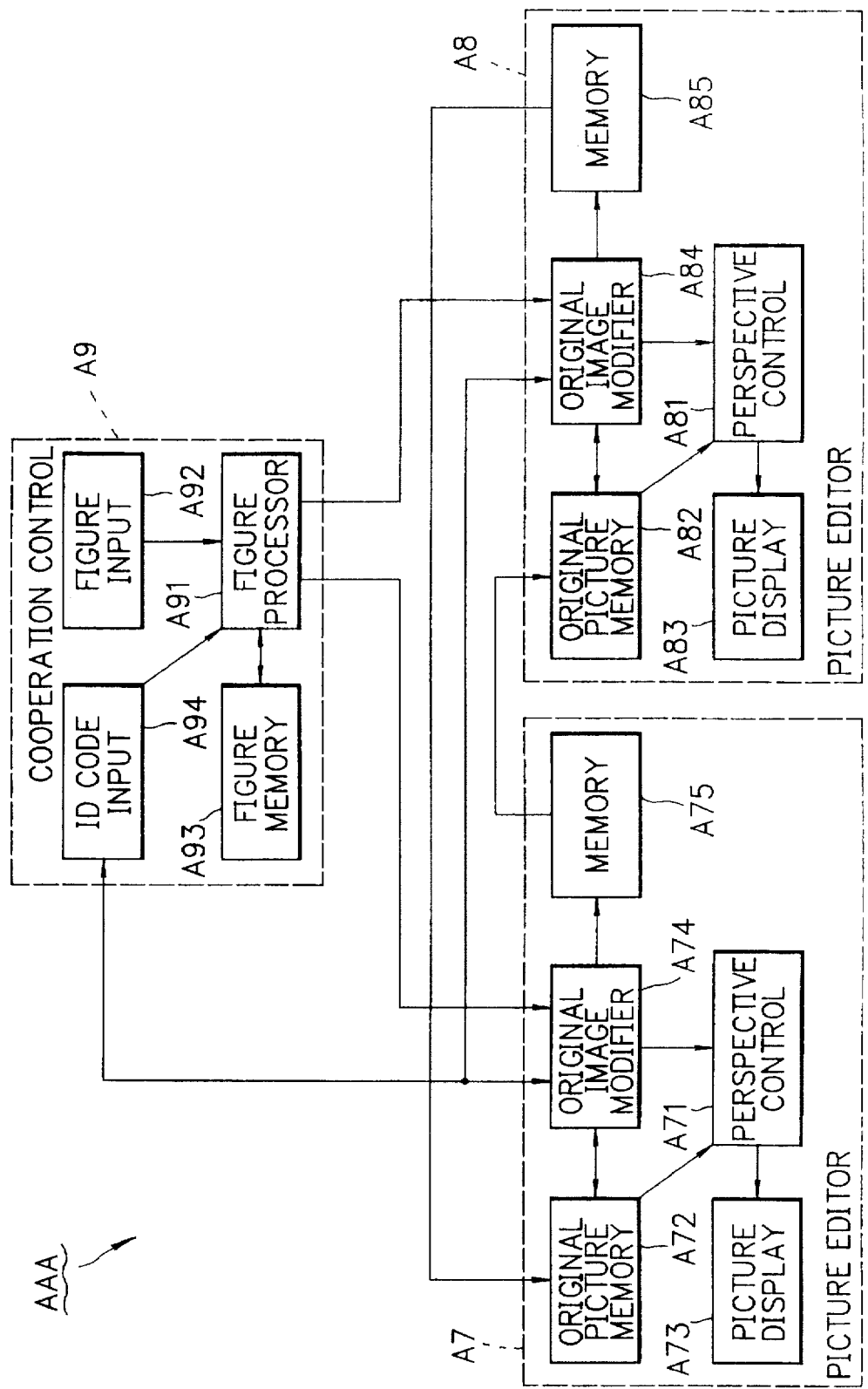
FIG. 19 is a block diagram of a perspective representation system according to an embodiment of the invention.

FIG. 19 illustrates a block diagram of yet another embodiment according to the present invention. The picture processing system AAA of FIG. 19 includes picture processors A7, A8 for forming a perspective image indicated in the monitor display, and cooperation control A9. Each of the picture editors A7, A8 are similarly configured to include a perspective control A71, A81, an original picture memory A72, A82, a picture display A73, A83, an original image modifier A74, A84, and memory devices A75, A85. The memory device A75 is coupled to the original picture memory A82 of the processor A8. On the other hand, memory unit A85 of the processor A8 is coupled to the original picture memory A72 of the processor A7.

The cooperation control A9 includes a figure input A92 coupled to a figure processor A91, which is coupled to figure memory A93. An ID code input A94 is coupled to the figure processor A91 and to the original image modifiers A74, A84 of processors A7, A8. The figure processor A91 is coupled to both original image modifier A74, A84 of processors A7, A8.

Figure 20:
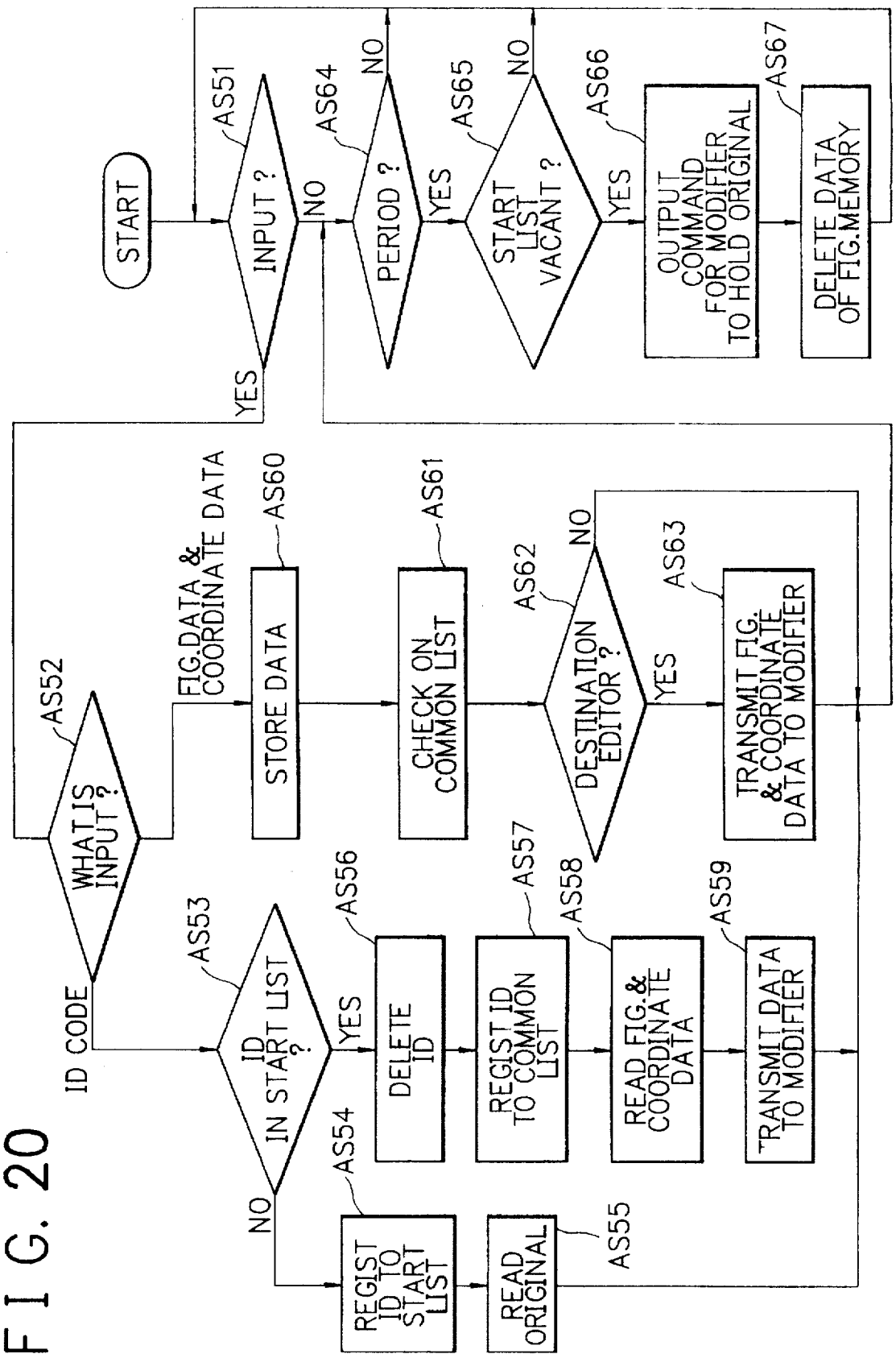
FIG. 20 is a flow chart of actions of a figure processor in the system of FIG. 19.

FIG. 20 illustrates a flow chart showing the operation of figure processor A91 of the cooperation control A9 of FIG. 19. Specifically, in step AS51, a determination is made as to whether an input has been received. If no input has been received, the process proceeds to Step AS64 to determine whether a period has been received. If not, the process returns to start. Otherwise, the process proceeds to determine whether there is a vacant list in step AS65; if not, the operation returns to start. If yes, an output command is initiated for the modifier to hold the original. In step AS67, the data within the figure memory is deleted.

Referring back to step AS51, if an input is provided, then the process proceeds to step AS52 to determine the type of input. If the type of input is an ID code, the process proceeds to step AS53 to determine if the ID code is in the start list. If not, the ID code is registered in the start list in step AS54, and then the original is read in step AS55. If the ID code is in the start list, then the process proceeds to step AS56 where it is deleted, and to step AS57 to register the ID code in the common list. In step AS58, the figure and coordinate data are read, and the data is transmitted to the modifier in step AS59.

Referring back to step AS52, if the type of input is figure data and coordinate data, then the data is stored in step AS60, and checked on the common list in step AS61. If the destination editor is not known in step AS62, the process ends, otherwise the figure data and coordinate data are transmitted to the modifier in step AS63.

Figure 22:
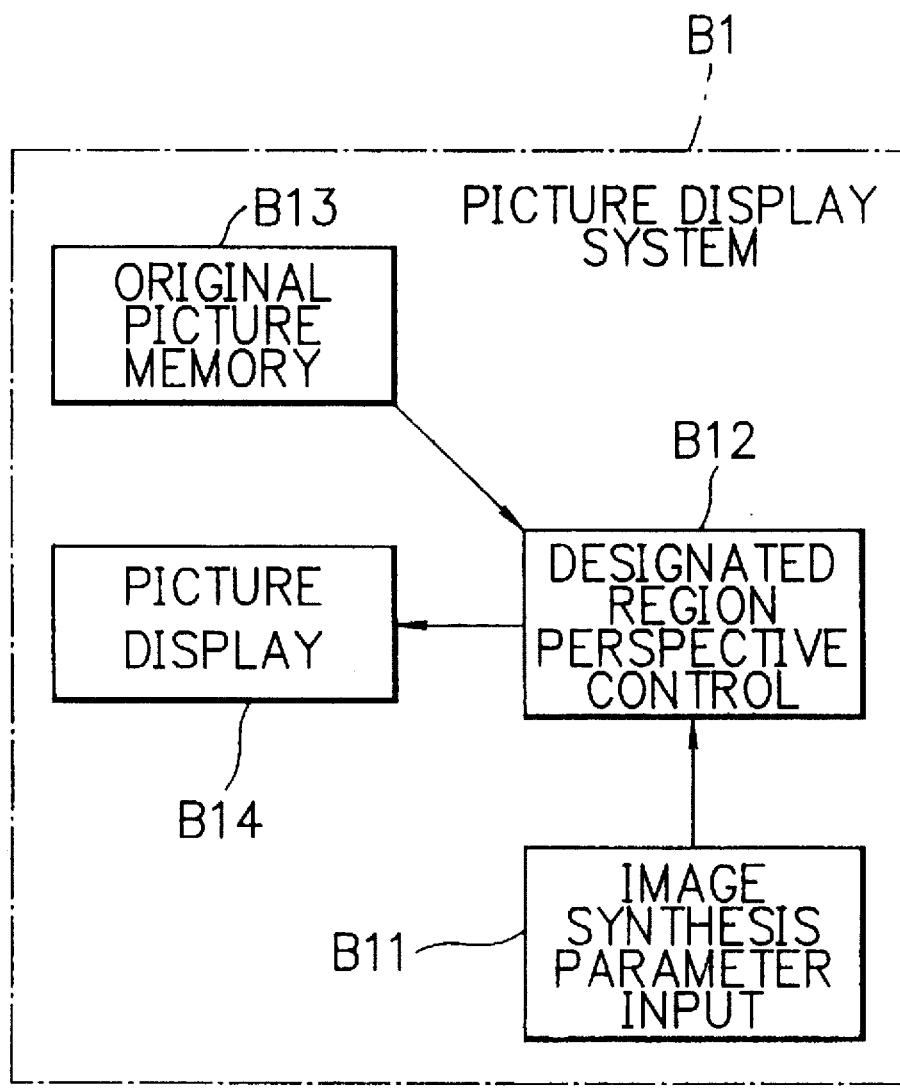
FIG. 22 is a block diagram of a picture display system as a perspective representation system according to an embodiment of the invention.

FIG. 22 is a block diagram of a picture display system as a perspective representation system according to another embodiment of the present invention. FIGS. 24A and 24B are illustrations of a perspective picture and four original pictures generated in the system of FIG. 22.

In FIG. 22, designated at reference character B1 is the picture display system. The system B1 comprises an image synthesis parameter input section B11 for inputting a number of externally supplied image synthesis parameters, a designated region perspective representation controller B12 for editing a region-designatable perspective picture A by using four different original pictures, an original picture memory B13 for storing the original pictures, and a picture display B14 for displaying the edited picture A.

The image synthesis parameters are seven in total, of which a first parameter represents a position vector $0^*$ or an origin (0,0) as a combination of coordinates of a left upper corner of the perspective picture A, a second parameter represents a position vector $P^*e0$ as a combination of coordinates of a right lower corner of the picture A, a third parameter represents a position vector $P^*a1$ as a combination of coordinates of a left upper corner of a rectangular region $B_0$ of a standard original picture B, the rectangular region $B_0$ being designatable to be displayed as the perspective picture A, a fourth parameter represents a position vector $P^*b1c1$ as a combination of coordinates of a center of the region $B_0$, a fifth parameter represents a position vector $P^*c1$ as a combination of coordinates of a right lower corner of the region $B_0$, a sixth parameter represents a contraction ratio Rx of a horizontally contracted one C of the original pictures to the standard one B, and a seventh parameter represents a contraction ratio Ry of a vertically contracted one D of the original pictures to the standard one B.

The perspective picture A just fits in BOX[$0^*$, $P^*e0$]. The standard original picture B just fits in BOX[$0^*$, $P^*e1$].

Contraction ratios Rx and Ry are numbers such that $0 \leq Rx < 1$ and $0 \leq Ry < 1$, respectively.

In the horizontally contracted picture C, $P*e2=(Rx, 1) \cdot P*e2$.

In the vertically contracted picture D, $P*e3=(1, Ry) \cdot P*e1$.

The horizontally and vertically contracted picture E just fits in BOX[0*, P*e4], where $P*e4=(Rx, Ry) \cdot P*e1$.

Figure 23:
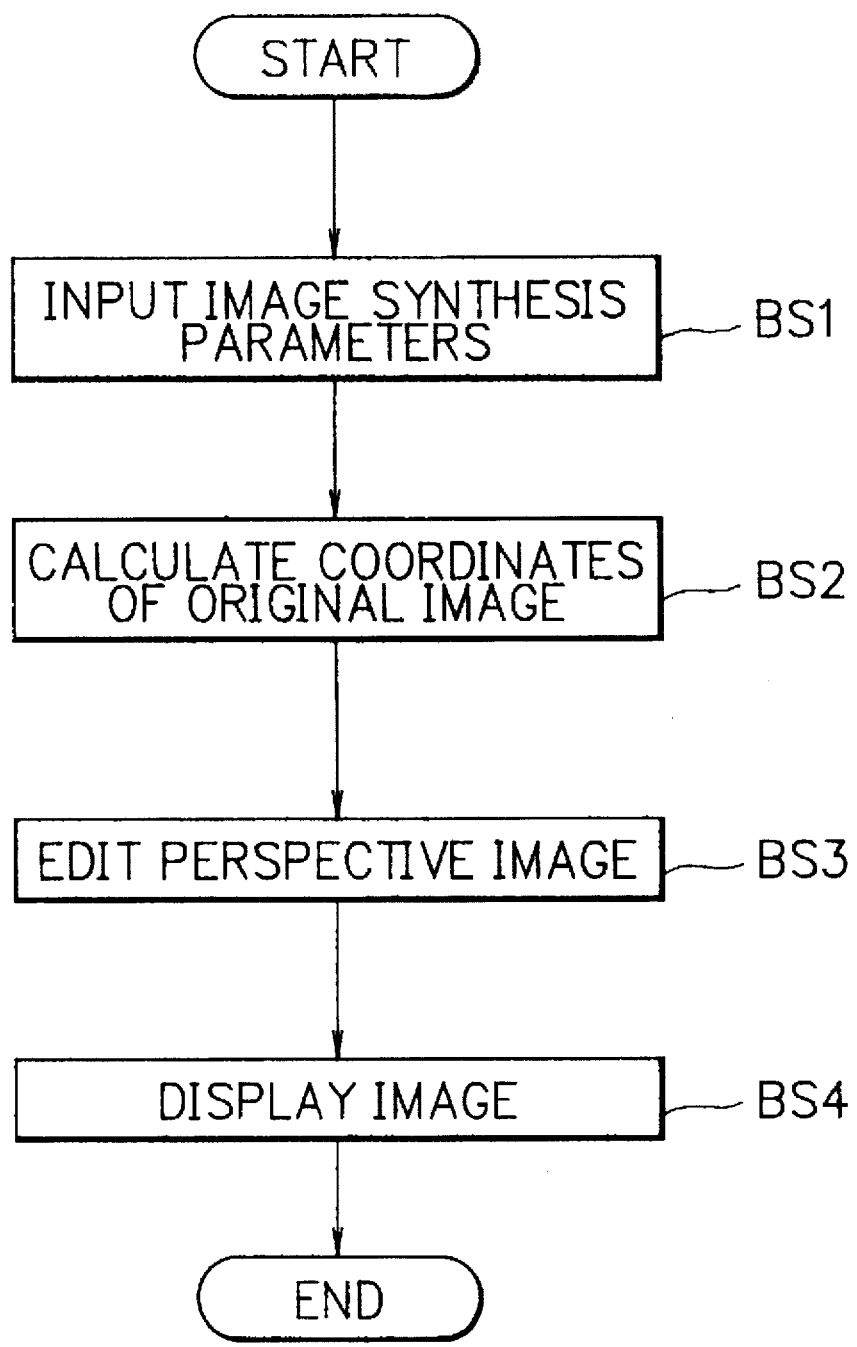
FIG. 23 is a flow chart of actions of the system of FIG. 22.

FIG. 23 is a flow chart of actions of the picture display system of FIG. 22.

At a step BS1, the input section B11 inputs one or more image synthesis parameters, including a data for designating the rectangular region $B_0$ in the original picture B.

At a step BS2, the perspective representation controller B12 responds to the input parameters to calculate a necessary number of combinations of coordinates for defining a central subregion $A_1$ of the perspective picture A, a central subregion $B_1$ of the standard original picture B, a horizontally contracted rectangular region $C_0$ and right and left subregions $C_1$ and $C_2$ thereof in the horizontally contracted original picture C, a vertically contracted rectangular region $D_0$ and upper and lower subregions $D_1$ and $D_2$ thereof in the vertically contracted original picture D, and a horizontally and vertically contracted rectangular region $E_0$ and four cornered subregions $E_1$ to $E_4$ thereof in the horizontally and vertically contracted original picture E.

Necessary vectors to define the subregion $A_1$ of the perspective picture A are $P*b0$ and $P*c0$; to define the subregion $B_1$ of the original picture B, $P*b1$ and $P*c1$; to define the region $C_0$ of the original picture C, $P*a2$ and $P*d2$; to define the subregion $C_1$ of the region $C_0$, $XY(P*c2, P*b2)$ and $XY(P*d2, P*c2)$; to define the subregion $C_2$ of the region $C_0$, $XY(P*a2, P*b2)$ and $XY(P*b2, P*c2)$; to define the region $D_0$ of the original picture D, $P*a3$ and $P*d3$; to define the subregion $D_1$ of the region $D_0$, $XY(P*b3, P*a3)$ and $XY(P*c3, P*b3)$; to define the subregion $D_2$ of the region $D_0$, $XY(P*b3, P*c3)$ and $XY(P*c3, P*d3)$; to define the region $E_0$ of the original picture E, $P*a4$ and $P*d4$; to define the subregion $E_1$ of the region $E_0$, $XY(P*c4, P*a4)$ and $XY(P*d4, P*b4)$; to define the subregion $E_2$ of the region $E_0$, $P*c4$ and $P*d4$; to define the subregion $E_3$ of the region $E_0$, $XY(P*a4, P*c4)$ and $XY(P*b4, P*d4)$; and to define the subregion $E_4$ of the region $E_0$, $P*a4$ and $P*b4$.

In the perspective picture $A_1$, the central subregion $A_1$ is represented by BOX[$P*b0, P*c0$]; a subregion $A_2$ at a right upper corner, by BOX[$XY(P*c0, 0*), XY(P*e0, P*b0)$]; a right peripheral subregion $A_3$, by BOX[$XY(P*c0, P*b0), XY(P*e0, P*c0)$]; a subregion $A_4$ at a right lower corner, by BOX[$P*c0, P*e0$]; a lower peripheral subregion $A_5$, by BOX[$XY(P*b0, P*c0), XY(P*c0, P*e0)$]; a subregion $A_6$ at a left lower corner, by BOX[$XY(0*, P*c0), XY(P*b0, P*e0)$]; a left peripheral subregion $A_7$, by BOX[$XY(0*, P*b0), XY(P*b0, P*c0)$]; a subregion $A_8$ at a left upper corner, by BOX[$0*, P*b0$]; and an upper peripheral subregion $A_9$, by BOX[$XY(P*b0, 0*), XY(P*c0, P*b0)$].

The central subregion $B_1$ of the designated region $B_0$ in the standard original picture B is represented by BOX[$P*b1, P*c1$]; the right subregion $C_1$ of the contracted region $C_0$ in the horizontally contracted picture C, by BOX[$XY(P*c2, P*b2), XY(P*d2, P*c2)$]; the left subregion $C_2$ of the contracted region $C_0$, by BOX[$XY(P*a2, P*b2), XY(P*b2, P*c2)$]; the upper subregion $D_1$ of the contracted region $D_0$ in the vertically contracted picture D, by BOX[$XY(P*b3, P*a3), XY(P*c3, P*b3)$]; the lower subregion $D_2$ of the contracted region $D_0$, by BOX[$XY(P*b3, P*c3), XY(P*c3, P*d3)$]; the subregion $E_1$ at a right upper corner of the contracted region $E_0$ in the horizontally and vertically contracted picture E, by BOX[$XY(P*c4, P*a4), XY(P*d4, P*b4)$]; the subregion $E_2$ at a right lower corner of the contracted region $E_0$, by BOX[$P*c4, P*d4$]; the subregion $E_3$ at a left lower corner of the contracted region $E_0$, by BOX[$XY(P*a4, P*c4), XY(P*b4, P*d4)$]; and the subregion $E_4$ at a left upper corner of the contracted region $E_0$, by BOX[$P*a4, P*b4$].

The perspective picture A is a perspective representation of the designated region $B_0$ such that:

central subregion $A_1$ of picture A=central subregion $B_1$ of designated region $B_0$;

right upper subregion $A_2$ of picture A=right upper subregion $E_1$ of region $E_0$;

right peripheral subregion $A_3$ of picture A=right subregion $C_1$ of region $C_0$;

right lower subregion $A_4$ of picture A=right lower subregion $E_2$ of region $E_0$;

lower peripheral subregion $A_5$ of picture A=lower subregion $D_2$ of region $D_0$;

left lower subregion $A_6$ of picture A=left lower subregion $E_3$ of region $E_0$;

left peripheral subregion $A_7$ of picture A=left subregion $D_2$ of region $D_0$;

left upper subregion $A_8$ of picture A=left upper subregion $E_4$ of region $E_0$; and upper peripheral subregion $A_9$ of picture A=upper subregion $D_1$ of region $D_0$; as well as $P*a2=(Rx, 1) \cdot P*a1 \cdot P*a3=(1, Ry) \cdot P*a1 \cdot P*a4=(Rx, Ry) \cdot P*a1$;

$P*b2=(Rx, 1) \cdot P*b1 \cdot P*b3=(1, Rx) \cdot P*b1 \cdot P*b4=(Rx, Ry) \cdot P*b1$;

$P*c2=(Rx, 1) \cdot P*c1 \cdot P*c3=(1, Ry) \cdot P*c1 \cdot P*c4=(Rx, Ry) \cdot P*c1$;

$P*d2=(Rx, 1) \cdot P*d1 \cdot P*d3=(1, Rx) \cdot P*d1 \cdot P*d4=(Rx, Ry) \cdot P*d1$; and $P*b1c1=P*b1+(P*c1-P*b1)/2$.

The designated region perspective representation controller B12 calculates coordiantes of:

$P*b0, P*c0, P*b1, P*c1, P*a2, P*b2, P*c2, P*d2, P*a3, P*b3, P*c3, P*d3, P*a4, P*b4, P*c4$ and $P*d4$ meeting the above conditions.

The designated region $B_0$ of the standard original picture B is thus represented by BOX[$P*a1, P*d1$]; the region $C_0$ in the horizontally contracted original picture C, as it is contracted from the designated region $B_0$ by the ratio Rx, by BOX[$P*a2, P*d2$]; the region $D_0$ in the vertically contracted original picture D, as it is contracted from the designated region $B_0$ by the ratio Rx, by BOX[$P*a3, P*d3$]; and the region $E_0$ in the horizontally and vertically contracted original picture E, as it is contracted from the designated region $B_0$ by the ratio Rx and Ry, by BOX[$P*a4, P*d4$].

Then, at a step BS3, the perspective representation controller B12 responds to a result of such calculations to make copies of a total of nine corresponding subregions of the regions $B_0$ to $E_0$ in the original pictures B to E stored in the original picture memory B13, synthesizing them to edit a perspective image.

At a step BS4, the edited image is sent as the perspective picture A to the display B14, where it is displayed.

Figure 25:
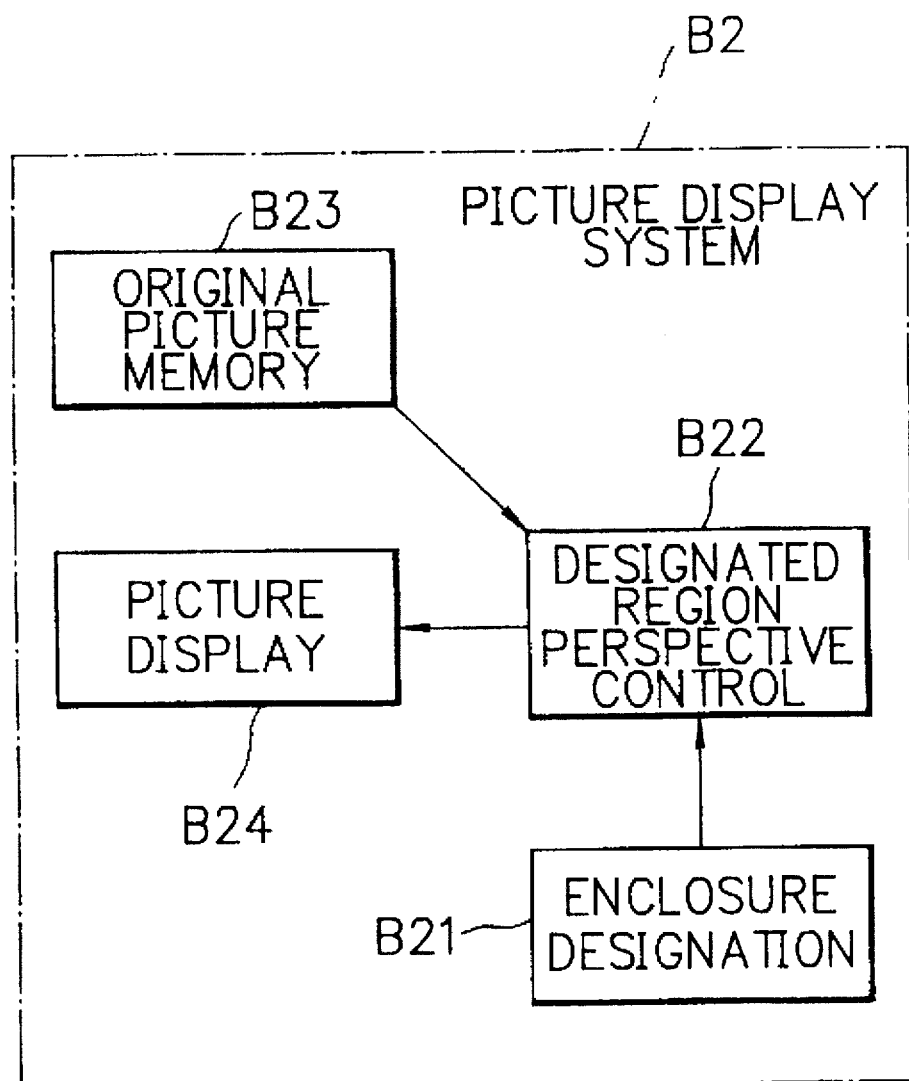
FIG. 25 is a block diagram of a picture display system as a perspective representation system according to an embodiment of the invention.
Figure 26:
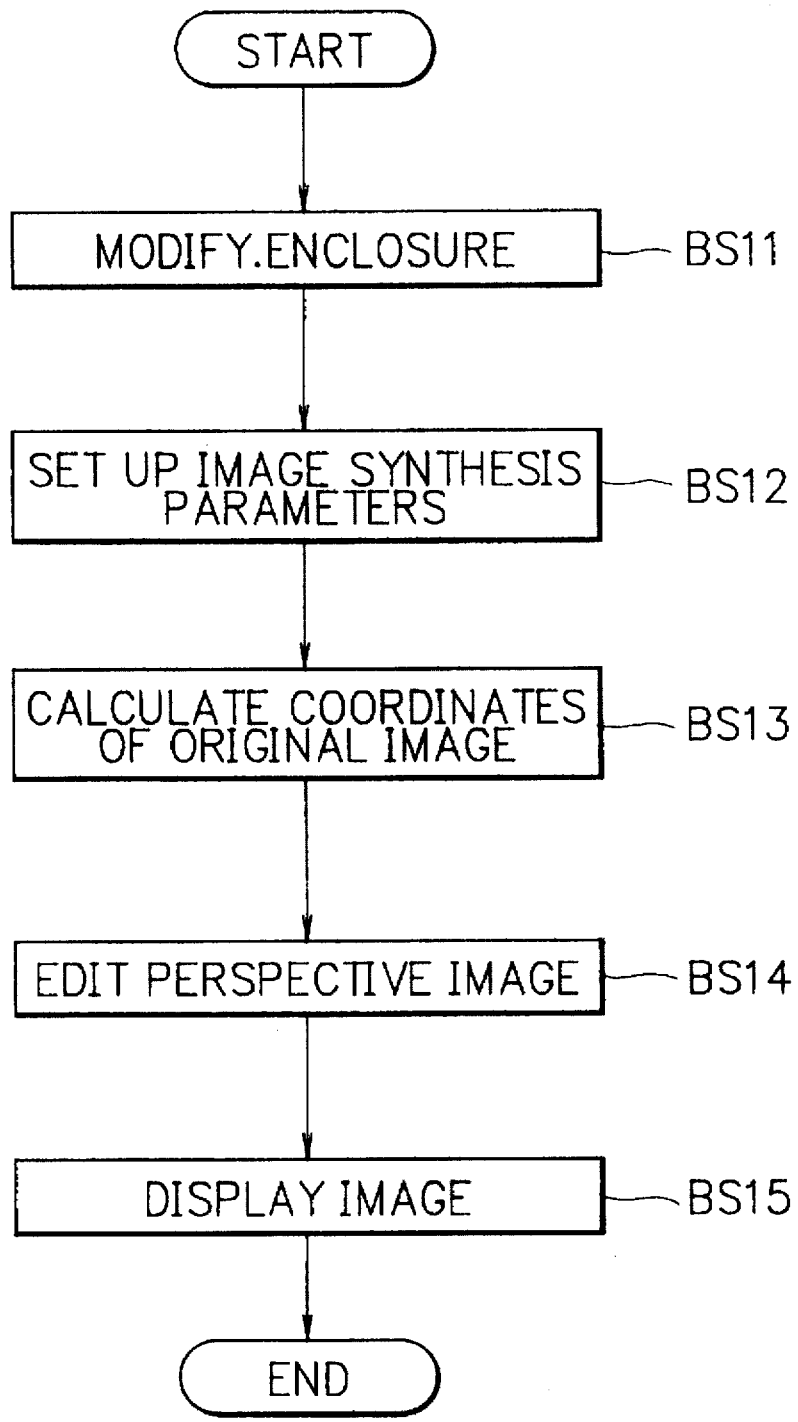
FIG. 26 is a flow chart of actions of the system of FIG. 25.
Figure 27:
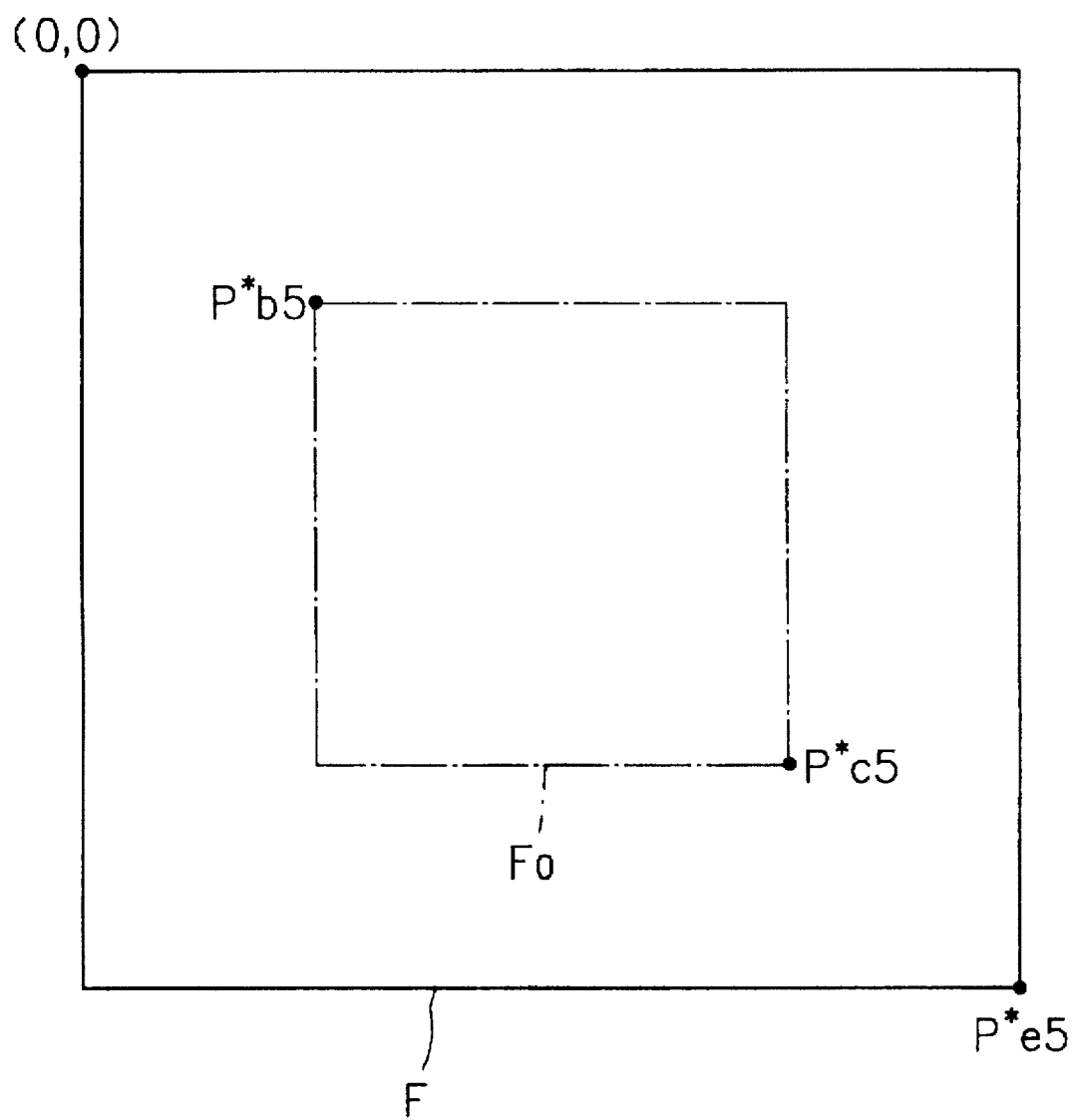
FIG. 27 is an illustration of a total original image with a region enclosure in the system of FIG. 25.

FIG. 25 is a block diagram of a picture display system as a perspective representation system according to another embodiment of the present invention. FIGS. 24A and 24B are illustrations of a perspective picture and four original pictures employable in the system of FIG. 25. FIG. 26 is a flow chart of actions of the system of FIG. 25. FIG. 27 is an illustration of a total original image with a region enclosure in the system of FIG. 25.

In FIG. 25, designated at reference character B2 is the picture display system. The system B2 comprises an enclosure designation section B21 for representing a total image F of original picture and a region enclosure $F_O$ as a rectangular frame for enclosing a region to be designated for a perspective representation, a designated region perspective representation controller B22 for editing a region-designatable perspective picture A by using four different original pictures, an original picture memory B23 for storing the original pictures, and a picture display B24 for displaying the edited picture A.

The system B2 is different from the system B1 simply in that the former B2 employs the region enclosure $F_O$ for a facile and flexible setting of image synthesis parameters.

The total image F of original picture has a just fittable size to BOX [0*, P*e5]. The enclosure $F_O$ has a rectangular form of which a left upper corner is designatable by a position vector P*b5 and a right lower corner is designatable by a position vector P*c5. The total image F and the region enclosure $F_O$ are displayed at the designated section B21.

At a step BS11, the region enclosure $F_O$ has its position as well as a size (designation area) changed or modified by a mouse, key board, etc. so that the position vectors P*b5 and P*c5 are updated.

At a step BS12, the designation section B21 sets up the image synthesis parameters in accordance with the updated position vectors P*b5 and P*c5 so that parameters P*a1 and P*d1 for defining a left upper corner and a right lower corner of a rectangular region $B_0$ in a standard original picture B are updated such that:

P*a1=P*e1·P*b5/P*e5
P*d1=P*e1·P*c5/P*e5.

At a step BS13, the perspective representation controller B22 receives the set-up parameters, and executes a similar process to the step BS3 of FIG. 23.

At a step BS14, like process to the step BS4 of FIG. 23 is executed to edit a perspective picture A.

Then, at a step BS15, the edited picture A is sent from the controller B22 to the picture display B24, where it is displayed.

Figure 28:
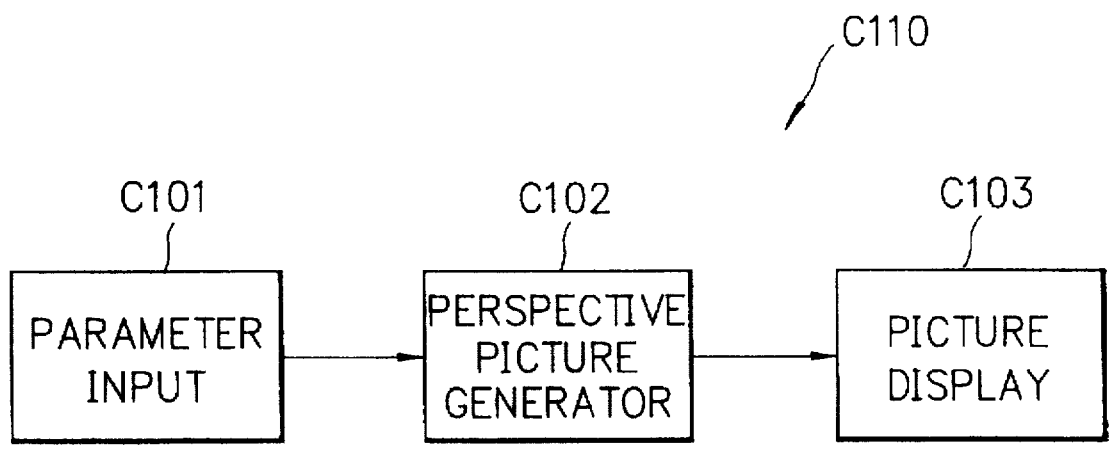
FIG. 28 is a block diagram of a perspective representation system according to an embodiment of the invention.
Figure 29:
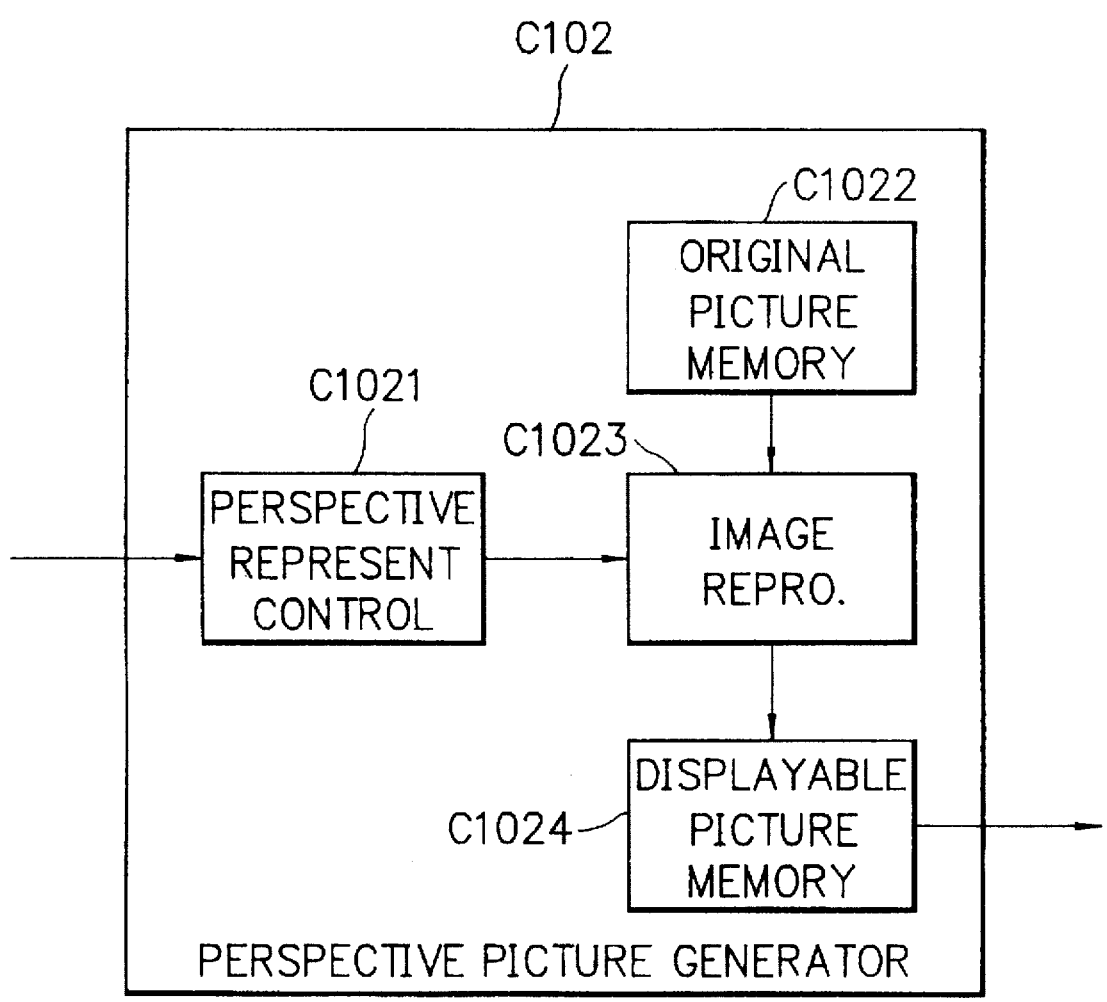
FIG. 29 is a block diagram of a perspective picture generator of the system of FIG. 28.

FIG. 28 is a block diagram of a perspective representation system C110 according to an embodiment of the present invention. FIG. 29 is a block diagram of a perspective picture generator C102 of the system C110.

The perspective representation system C110 comprises a picture editor including an image synthesis parameter input section C101, the perspective picture generator C102 and a picture display C103.

The perspective picture generator C102 comprises a perspective representation controller C1021, an original picture memory C1022, an image reproduction section C1023 and a displayable picture memory C1024.

The original picture memory C1021 has stored therein a standard original picture, a horizontally contracted picture of the standard original picture, a vertically contracted picture of the standard original picture, and a horizontally and vertically contracted picture of the standard original picture.

The perspective representation controller C1021 edits a perspective picture by copying a central subregion of the standard original picture, right and left subregions of the horizontally contracted picture, upper and lower subregions of the vertically contracted picture, and four cornerd subregions of the horizontally and vertically contracted picture.

The parameter input section C101 inputs size paramter values.

Such an arrangement is known. However, though unshown, the controller C1021 includes a reproduction control means, a displayable image reproduction means and a displayable picture memory means, like a perspective representation controller in later-described system in conjunction with FIG. 30.

Moreover, the perspective representation system C110 is placed under control of the cooperation controller A3 of FIG. 12, like later-described system in conjunction with FIG. 30.

Moreover, the system C110 may be adapted for a region designation described in conjunction with FIGS. 22 and 25, as well as a later-described system in conjunction with FIGS. 30 and 33.

Figure 31:
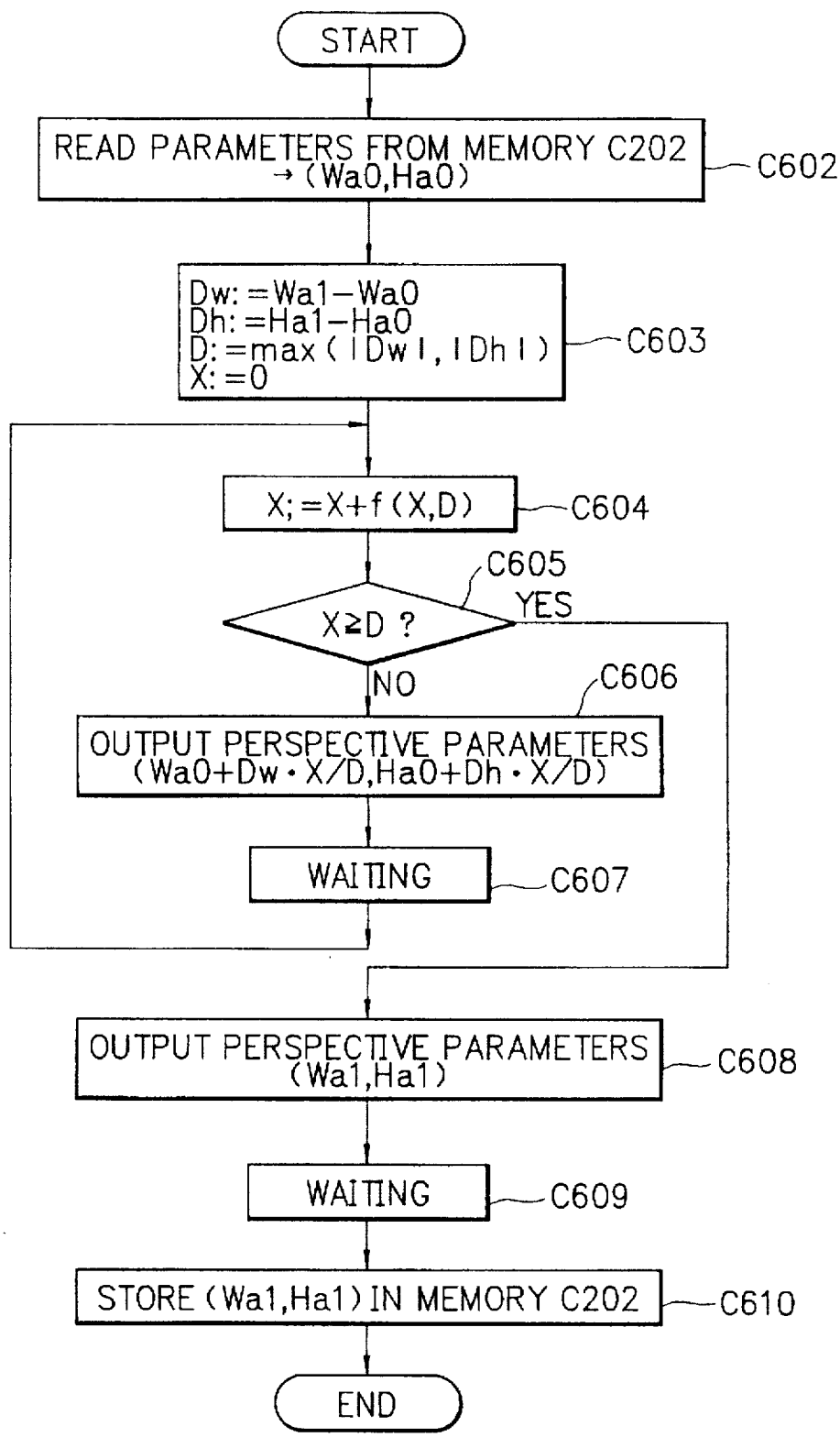
FIG. 31 is a flow chart of actions of a medium parameter generator of the system of FIG. 30.
Figure 32A:
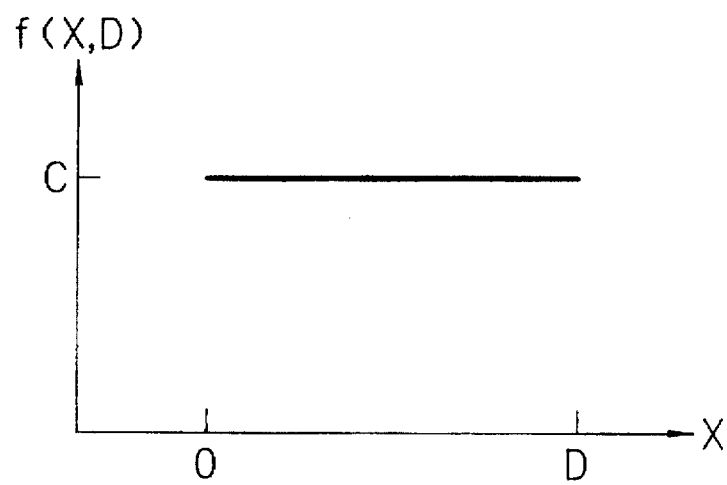
FIGS. 32A and 32B are graphs describing a function of the medium parameter generator of the system FIG. 30.
Figure 32B:
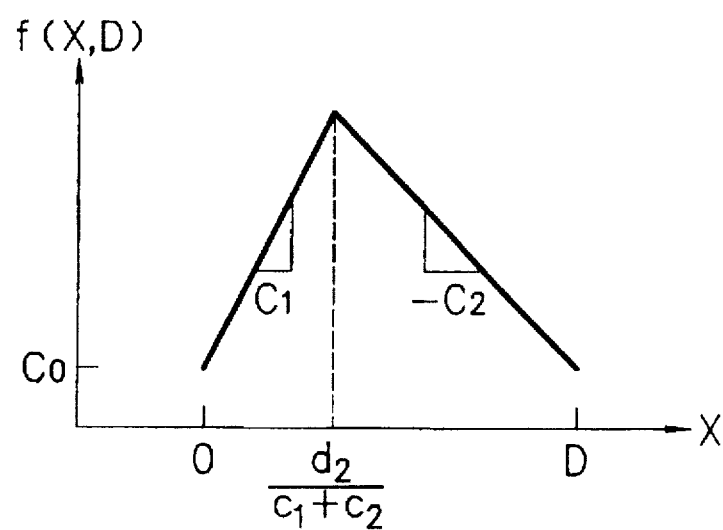

FIG. 30 is a block diagram of a picture display system as a perspective representation system according to another embodiment of the present invention. FIGS. 1 and 2 are illustrations of a perspective picture and four original pictures employable in the system of FIG. 30. FIG. 31 is a flow chart of actions of a medium parameter generator of the system of FIG. 30. FIGS. 32A and 32B are graphs describing a function of the medium parameter generator of the system FIG. 30.

In FIG. 30, designated at reference character C210 is the perspective representation system. The system C210 comprises an image synthesis parameter input section C101, a medium parameter generator C201, a parameter memory C202, a perspective picture generator C102, and a picture display C103.

The parameter input section C101 receives a set of coordinate signals from an external coordinate input device such as a key board, mouse, etc. and converts the same into a number of values of which a respective one represents a corresponding one of a preset number of perspective representation parameters. The parameter memory C202 has stored therein a current value of each perspective representation parameter.

Upon reception of a new parameter value from the input section C101, the parameter generator C201 reads a stored value of a corresponding parameter in the memory C202, and generates a sequence of intermediate parameter values gradually varying from the read value to the input value. The generated parameter values are sequentially input to the picture generator C102, where a series of corresponding perspective pictures are generated to be sequentialy output to the picture display C103, so that a displayed picture is sequentially updated. The parameter value received from the input section C101 is stored in the memory C202, as an updated current value.

It is now assumed that Wa and Ha represent a width Hc and a height Vc of a subregion ① in a perspective picture 810 of FIG. 1, respectively.

At a step C602, as a pair of perspective parameters (Wa1, Ha1) are input from the input section C101, the parameter generator C201 reads a pair of current values of corresponding parameters from the memory C202. The current values has been stored at a later-described step C610 in a previous cycle. The read values are set to be (Wa0, Ha0). If no current values are stored in the memory C202, such as in an initial cycle, the input values (Wa1, Ha1) or preset adequate values may be set as (Wa0, Ha0).

At a step C603, four variables Dw, Dh, D and X have their values determined such that:

Dw:=Wa1−Wa0
Dh:=Ha1−Ha0
D:=max(|Dw|,|Dh|)
X:=0.

At a step C604, a value of expression X+f(X,D) is substituted for the variable X, where f is a two-variable function such that f(A,B)>0 and f(A,A)≧0 for any and all pair of numbers A and B meeting a condition of 0≦A<B.

At a step C605, a comparison is made between variables X and D. If X≧D, the flow goes to a step C608. In other cases, the flow goes to a step C606.

At the step C606, intermediate parameter values (Wa0+Dw·X/D, Ha0+Dh·X/D) are caculated by an interpolation between (Wa0, Ha0) and (Wa1, Ha1), to be output to the picture generator C102.

At a step C607, the flow is halted for a predetermined period of time, or until a reception of a subsequent parameter is permitted such as by a completion of a picture generation based on the current parameter values, as they have been given at the step C606 in the previous cycle.

Thereafter, the flow goes to the step C604.

At the step C608, the parameter values (Wa1, Ha1) received from the input section C101 are output to the picture generator C102.

Then, at a step C609, the flow is halted for a predetermined period of time, or until a reception of a subsequent parameter is permitted such as by a completion of a picture generation based on the current parameter values, as they have been given at the step C606 in the previous cycle.

Thereafter, at a step C610, the parameter values (Wa1, Ha1) are stored in the memory C202.

The function f will be exemplified below.

Example-1

Letting C be a constant, the function f is defined such that f(X,D)≡C. FIG. 32A is a graphic representation of this function.

By use of such the function, the perspective representation parameters to be output from the generator C201 have values thereof variable at a constant rate, i.e. by constant differences, each time when the parameter input section C101 inputs parameters.

Accordingly, the parameters to be input to the picture generator C102 are kept free from instantaneous large changes, permitting an effective prevention against remarkable sudden changes that otherwise might occur in a perspective picture displayed on the picture display C103.

Example-2

The function f is defined such that:

f(X,D)≡C1·X+C0 (C1·X≦C2·(D−X)) or C2·(D−X)+C0 (for others), where C0 is an arbitrary positive constant, and C1 and C2 are arbitrary positive constant or null. FIG. 32B is a graphic representation of this function.

By use of this function, values of the perspective representation parameters to be output from the generator C201 change initially progressively to large variations and thereafter slowly reduce to small variations.

Such an acceleration or deceleration in variation of parameter value provides a more natural motion than the example-1, as a concerned point in a perspective picture makes a similar motion to a mass following the natural laws.

Therefore, even when an average speed change is increased to reduce a required time for a parameter value variation, an even followability of eyes can be readily achieved relative to the example-1.

The system C210 thus responds to a parameter input to provide a plurality of intermediate parameter values to be each employed for generating a corresponding perspective picture to be displayed, needing a high-speed processing.

To this point, a picture reproduction in a picture memory can be performed at a higher speed than that between different picture memories.

Accordingly, a higher reproduction speed can be achieved by copying a reusable image within storage regions of a displayable picture memory.

Figure 33:
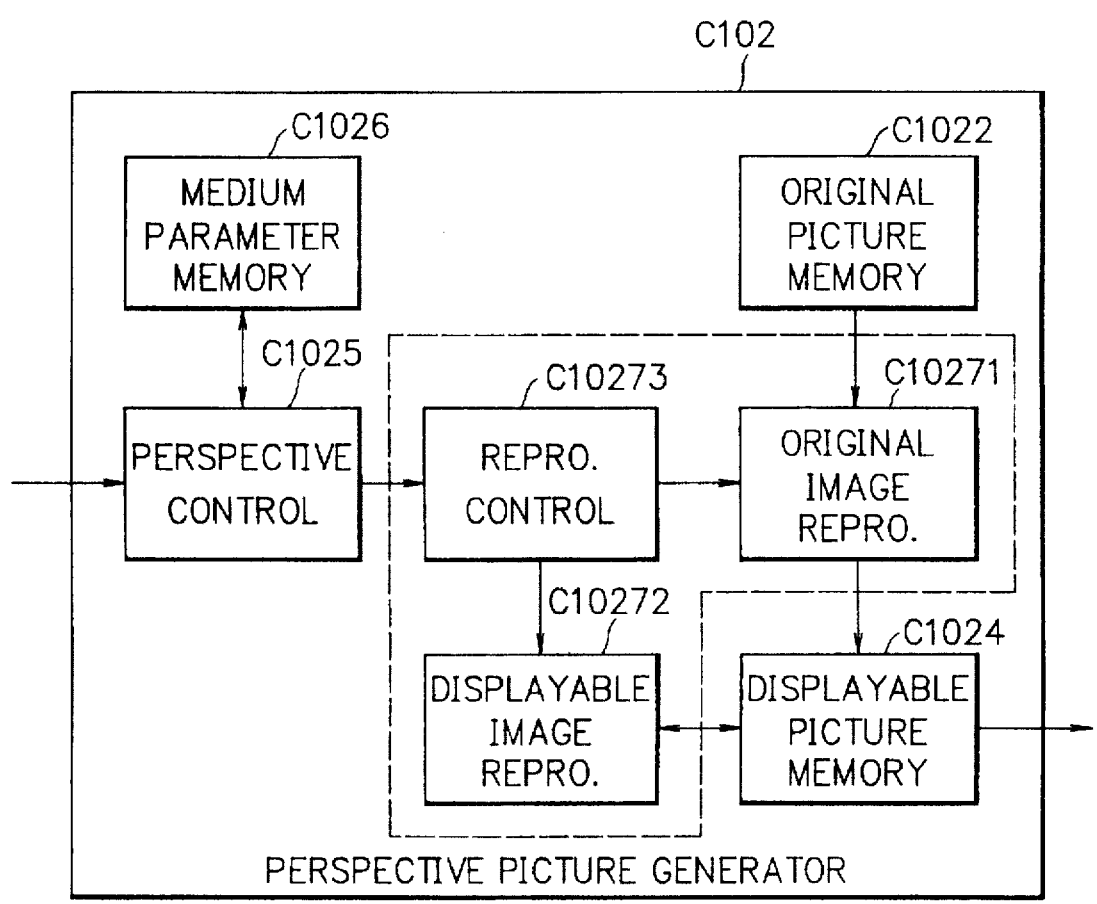
FIG. 33 is a block diagram of a perspective picture generator according to a modification of the embodiment shown in FIG. 30.

FIG. 33 is a block diagram of a perspective picture generator C102 according to a modification of the embodiment shown in FIG. 30. Like members are designated by like reference characters.

The picture generator C102 comprises a perspective representation controller C1025, a medium parameter memory C1026, an original picture memory C1022, a displayable picture memory C1024, and a combination of a reproduciton controller C10273, an original image reproduction section C10271 and a displayable image reproduciton section C10272 linked with the displayable picture memory C1024.

The medium parameter memory C1026 has stored therein a pair of perspective representation parameters (Wa0, Ha0) corresponding to a current perspective picture edited in the displayable picture memory C1024.

The parameter input section C101 inputs a new pair of perspective representation parameters (Wa1, Ha1) into the parameter generator C201, where they are processed together with the parameters read from the parameter memory C202 to generate a pair of medium parameters (Wa0+α, Ha1+β) to be output to the perspective picture generator C102, where α and β may be Dw·X/D and Dh·X/D, respectively.

In the perspective picture generator C102, the perspective representation controller C1025 responds to the medium parameters (Wa0+α, Ha1+β) input from the parameter generator C201 and the parameters (Wa0, Ha0) read from the medium parameter memory C1026 for determining, for a respective one of nine subregions ①-⑨ of a subsequent perspective picture 810 to be edited based on the medium parameters (Wa0+α, Ha1+β), which region of the current perspective picture 810 edited in the displayable picture memory C1024 based on the parameters (Wa0, Ha0) stored in the parameter memory C1026 is reusable, and which region thereof is not reusable, as a partial image to edit an image of the respective subregion of the subsequent perspective picture.

For the reusable region, the representation controller C1025 determines a region in the displayable picture memory C1024 for a reproduction therefrom and a region therein for a reproduction thereon. For the not reusable region, the controller C1025 determines a region in the original picture memory C1022 for a reproduction therefrom and a region in the displayable picture memory C1024 for a reproduction thereon.

Then, the controller C1025 informs the reproduction controller C10273 of a picture reproduction means C1027 of the regions for the reproduction therefrom or thereon in an order such that, relative to a region separation line, as it moves, a reproduction at a forward side precedes a reproduction at an opposite side.

In the case the region informed from the perspective picture controller C1025 for a reproduction therefrom is a region in the original picture memory C1022, the reproduction controller C10273 designates the informed region for the reproduction therefrom and an informed region for the reproduction thereon, to the original image reproduction unit C10271, requesting the reproduction.

The original image reproduciton unit C10271 copies image data of the designated region in the original picture memory C1022 for the reproduction therefrom, onto the designated region in the displayable picture memory C1024.

In the case the region informed from the perspective picture controller C1025 for a reproduction therefrom is a region in the displayable picture memory C1024, the reproduction controller C10273 designates the informed region for the reproduction therefrom and an informed region for the reproduction thereon, to the displayable image reproduction unit C10272, requesting the reproduction.

The displayable image reproduction unit C10272 copies image data of the designated region in the displayable picture memory C1024 for the reproduction therefrom, onto the designated region in the displayable picture memory C1024.

Accordingly, the displayable picture memory C1024 has the subsequent perspective picture edited therein based on the medium parameters (Wa0+α, Ha1+β).

Then, the medium parameters (Wa0+α, Ha1+β) are stored in the medium parameter memory C1026, and the perspective representation controller C1025 waits a subsequent pair of medium parameters to be input from the parameter generator C201.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A perspective representation system including:

an original picture memory means for storing an original picture;

a displayable picture memory means for storing a displayable picture;

a picture reproduction means for reproducing the original picture in the displayable picture;

a parameter input means for receiving image reproduction parameters; and a picture display means for visualizing the displayable picture, wherein the picture reproduction means comprises:

an original picture reproduction means for reproducing a partial image of the original picture stored in the original picture memory means;

a displayable picture reproduction means for reproducing a partial image of the displayable picture stored in the displayable picture memory means; and a reproduction control means, responsive to the image reproduction parameters, and comprising means for designating a rectangular partial region of the original picture to be reproduced, means for designating a rectangular partial region of the displayable picture at a reproduction end, and means for generating information corresponding to a relationship between the displayable picture and the original picture, including that an image of a certain region of the displayable picture and an image of a certain region of the original picture are equivalent to each other, and comprising means for instructing the displayable picture reproduction means to reuse part of the displayable picture, as part of the region at the reproduction end, and to reproduce from the original picture a region at the reproduction end in order to reproduce a portion of the original picture in the displayable picture.

2. A perspective representation system according to claim 1, wherein the original picture memory means stores a standard original picture, a horizontally contracted original picture, a vertically contracted original picture and a horizontally and vertically contracted original picture, wherein the parameter input means inputs a parameter of a perspective picture, and wherein the system further comprises a perspective representation control means operable, when the parameter of the perspective picture is updated, to control the original and displayable picture reproduction means for a reproduction to a respective one of rectangular partial regions of the perspective picture.

3. A perspective representation system according to claim 2, wherein the perspective representation control means further comprises means for generating a moving direction of an arbitrary one of a total of four separation lines dividing the perspective picture horizontally into three regions and vertically into three regions, as the parameter of the perspective picture is updated, to instruct the original and displayable picture reproduction means to execute reproduction in a region at a forward side of the moving direction relative to the arbitrary separation line, with priority being given to a region lying at an opposite side to the moving direction relative to the arbitrary separation line.

4. A perspective representation method including the steps of:

storing an original picture;

storing a displayable picture;

reproducing the original picture in the displayable picture;

receiving image reproduction parameters; and visualizing the displayable picture, wherein the original picture reproducing step comprises the steps of:

reproducing a partial image of the original picture;

reproducing a partial image of the displayable picture; and generating in response to the image reproduction parameters, a designation of a rectangular partial region of the original picture to be reproduced, a designation of a rectangular partial region of the displayable picture at a reproduction end, and information corresponding to a relationship between the displayable picture and the original picture, including that an image of a certain region of the displayable picture and an image of a certain region of the original picture are equivalent to each other, and reusing part of the displayable picture, as part of the region at the reproduction end, and reproducing from the original picture a region at the reproduction end in order to reproduce a portion of the original picture in the displayable picture.

5. A perspective representation system comprising:

a plurality of perspective picture editor means each for editing and to display a perspective picture composed of a displayable rectangular subregion of a standard original picture, a subregion of a horizontally contracted picture of the standard original picture, a subregion of a vertically contracted picture of the standard original picture and a subregion of a horizontally and vertically contracted picture of the standard original picture, in a perspectively representing manner based on image synthesis parameters including a size of the perspective picture, a size of the standard original picture, a center coordinate of the rectangular subregion, a contraction ratio of the horizontally contracted picture to the standard original picture and a contraction ratio of the vertically contracted picture to the standard original picture; and a cooperation control means for controlling the plurality of perspective picture editor means, wherein the plurality of perspective picture editor means each comprises:

means for transmitting to the cooperation control means the center coordinate, as the center coordinate is changed; and means for editing the perspective picture in accordance with the center coordinate, as the center coordinate is transmitted from the cooperation control means, wherein the cooperation control means comprises:

means for transmitting the center coordinate to the other perspective picture editor means.

6. A perspective representation system comprising:

a plurality of perspective picture editor means each for editing and to display a perspective picture composed of a displayable rectangular subregion of a standard original picture, a subregion of a horizontally contracted picture of the standard original picture, a subregion of a vertically contracted picture of the standard original picture and a subregion of a horizontally and vertically contracted picture of the standard original picture, in a perspectively representing manner based on image synthesis parameters including a size of the perspective picture, a size of the standard original picture, a center coordinate of the rectangular subregion, a contraction ratio of the horizontally contracted picture to the standard original picture and a contraction ratio of the vertically contracted picture to the standard original picture; and a cooperation control means for controlling the plurality of perspective picture editor means, wherein the cooperation control means comprises means, responsive to a set of externally input data on a figure to be added to an original picture set including the standard original picture, the horizontally contracted original picture, the vertically contracted original picture and the horizontally and vertically contracted original picture and on coordinates for arranging the figure, for transmitting the set of data on the figure and the arranging coordinates to the plurality of perspective picture editor means, and wherein the plurality of perspective picture editor means each comprises:

modification means for modifying the original picture set in accordance with the set of data on the figure and the arranging coordinates, as the set of data on the figure and the arranging coordinates are transmitted thereto from the cooperation control means; and a perspective representation control means for generating the perspective picture from the original picture set, as the original picture is modified by the modification means.

7. A perspective representation system according to claim 6, wherein the perspective representation control means comprises:

means responsive to the set of data transmitted from the cooperation control means for synthesizing the figure into the standard original picture; and means responsive to the set of data transmitted from the cooperation control means for transforming the figure based on the contraction ratios to provide a horizontally contracted figure, a vertically contracted figure and a horizontally and vertically contracted figure and for synthesizing the horizontally contracted figure, the vertically contracted figure and the horizontally and vertically contracted figure into the horizontally contracted original picture, the vertically contracted original picture and the horizontally and vertically contracted original picture.

8. A perspective representation system comprising:

a total of N perspective picture editor means, where N is a positive integer, each for editing and to display a perspective picture composed of a displayable rectangular subregion of a standard original picture, a subregion of a horizontally contracted picture of the standard original picture, a subregion of a vertically contracted picture of the standard original picture and a subregion of a horizontally and vertically contracted picture of the standard original picture, in a perspectively representing manner based on image synthesis parameters including a size of the perspective picture, a size of the standard original picture, a center coordinate of the rectangular subregion, a contraction ratio of the horizontally contracted picture to the standard original picture and a contraction ratio of the vertically contracted picture to the standard original picture; and a cooperation control means for controlling the N perspective picture editor means, wherein the cooperation control means comprises:

memory means for storing a set of externally input data of a figure to be added to an original picture set comprising the standard original picture, the horizontally contracted original picture, the vertically contracted original picture and the horizontally and vertically contracted original picture and of coordinates for arranging the figure; and means for transmitting the set of stored data in the memory means to a total of M of the N perspective picture editor means, where M is a positive integer such that $M \leq N$, and wherein a respective one of the N perspective picture editor means includes:

modification means for modifying the original picture set in accordance with the set of data of the figure and the arranging coordinates, as the set of data of the figure and the arranging coordinates are transmitted thereto from the cooperation control means;

perspective representation control means for generating the perspective picture from the original picture set, as the original picture is modified by the modification means;

memory device for storing the original picture set corresponding to a displayed perspective picture set at predetermined intervals of time; and means operative, when the respective perspective picture editor means is newly started, for reading the original picture set from the memory device of one of the N perspective picture editor means that has been started.

9. A perspective representation system according to claim 8, wherein the cooperation control means further comprises means for deleting the set of stored data in the memory means after having indicated to the memory device to store the original picture set corresponding to the displayed perspective picture.

10. A perspective representation system according to claim 8, wherein the cooperation control means further comprises hold means for holding identification data of the M perspective picture editor means.

11. A perspective representation system including a memory means for storing an original picture set comprising a standard original picture and horizontally contracted, vertically contracted and horizontally and vertically contracted pictures of the standard original picture, the system being operable for editing and to display a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters on including a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture, wherein the system further comprises:

computation means for computing coordinates of the displayable rectangular regions respectively of a region of the horizontally contracted picture corresponding to a designated region provided in the image synthesis parameters to designate a size of the standard original picture, a region of the vertically contracted picture corresponding to the designated region, and a region of the vertically contracted picture corresponding to the designated region, as computed in accordance with the designated region and the contraction ratios; and means responsive to the computed coordinates for reading from the memory means a rectangular region in the designated region of the standard original picture, a rectangular region in the corresponding region of the horizontally contracted picture, a rectangular region in the corresponding region of the vertically contracted picture and a rectangular region in the corresponding region of the horizontally and vertically contracted picture, to generate a perspective picture corresponding to the designated region.

12. A perspective representation system according to claim 11, wherein the system further comprises an input means for inputting the image synthesis parameters provided with the designated region.

13. A perspective representation method comprising the steps of:

storing an original picture set comprising a standard original picture and horizontally contracted, vertically contracted and horizontally and vertically contracted pictures of the standard original picture;

editing and displaying a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters including a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture;

computing coordinates of the displayable rectangular regions respectively of a region of the horizontally contracted picture corresponding to a designated region provided in the image synthesis parameters to designate a size of the standard original picture, a region of the vertically contracted picture corresponding to the designated region and a region of the vertically contracted picture corresponding to the designated region, as computed in accordance with the designated region and the contraction ratios; and responding to the computed coordinates for reading a rectangular region in the designated region of the standard original picture, a rectangular region in the correspondence region of the horizontally contracted picture, a rectangular region in the corresponding region of the vertically contracted picture and a rectangular region in the corresponding region of the horizontally and vertically contracted picture, to generate a perspective picture corresponding to the designated region.

14. A perspective representation system comprising memory means for storing an original picture set comprising a standard original picture and horizontally contracted, vertically contracted and horizontally and vertically contracted pictures of the standard original picture, the system being operable for editing and displaying a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters on a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture, wherein the system further comprises:

display means for displaying the standard original picture and an enclosing frame designating the size of the standard original picture;

means for varying a range of the displayed enclosing frame on the display means in accordance with an external instruction;

calculation means for calculating coordinates of the respective displayable rectangular subregions of a range region of the horizontally contracted original picture corresponding to the range of the enclosing frame, a range region of the vertically contracted original picture corresponding to the range of the enclosing frame and a range region of the vertically contracted original picture corresponding to the range of the enclosing frame, as computed based on the contraction ratios and the range of the enclosing frame; and means responsive to the calculated coordinates for reading from the memory means the rectangular subregion within the range region of the enclosing frame in the standard original picture, the rectangular subregion within the range region of the enclosing frame in the horizontally contracted original picture, the rectangular subregion within the range region of the enclosing frame in the vertically contracted original picture and the rectangular subregion within the range region of the enclosing frame in the horizontally and vertically contracted original picture to edit the perspective picture in correspondence to the range of the enclosing frame.

15. A perspective representation system according to claim 14, wherein the system further comprises a designation means for designating the range of the enclosing frame.

16. A perspective representation method comprising the steps of:

storing an original picture set comprising a standard original picture and horizontally contracted, vertically contracted and horizontally and vertically contracted pictures of the standard original picture;

editing and displaying a perspective picture composed of a displayable rectangular subregion of the standard original picture, a displayable rectangular subregion of the horizontally contracted picture, a displayable rectangular subregion of the vertically contracted picture and a displayable rectangular subregion of the horizontally and vertically contracted picture in a perspectively representing manner based on image synthesis parameters on a size of the perspective picture, a size of the standard original picture, a center coordinate of the rectangular subregion of the standard original picture, a contraction ratio of the horizontally contracted picture to the standard original picture and a contraction ratio of the vertically contracted picture to the standard original picture;

displaying the standard original picture and an enclosing frame designating the size of the standard original picture;

varying a range of the displayed enclosing frame in accordance with an external instruction;

calculating coordinates of the respective displayable rectangular subregions of a range region of the horizontally contracted original picture corresponding to the range of the enclosing frame, a range region of the vertically contracted original picture corresponding to the range of the enclosing frame and a range region of the vertically contracted original picture corresponding to the range of the enclosing frame, as computed based on the contraction ratios and the range of the enclosing frame; and responding to the calculated coordinates for reading the rectangular subregion within the range region of the enclosing frame in the standard original picture, the rectangular subregion within the range region of the enclosing frame in the horizontally contracted original picture, the rectangular subregion within the range region of the enclosing frame in the vertically contracted original picture and the rectangular subregion within the range region of the enclosing frame in the horizontally and vertically contracted original picture to edit the perspective picture in correspondence to the range of the enclosing frame.

17. A perspective representation system comprising:

parameter input means for inputting a perspective representation parameter;

medium parameter generation means for generating a plurality of medium parameters of a perspective picture;

parameter memory means for storing the perspective representation parameter;

perspective picture generation means for generating the perspective picture; and picture display means for displaying the perspective picture depending on the perspective representation parameter, wherein the medium parameter generation means provides the perspective picture generation means with a plurality of said medium parameters varying from the stored perspective representation parameter to the input perspective parameter, and stores the perspective representation parameter in the parameter memory means.

18. A perspective representation system according to claim 17, wherein the medium parameter generation means provides the perspective picture generation means with a sequence of said medium parameters of which an arbitrary neighboring pair have a constant difference therebetween, varying from the stored perspective representation parameter in the memory means to the input perspective representation parameter.

19. A perspective representation system according to claim 17, wherein the medium parameter generation means provides the perspective picture generation means with a first sequence of said medium parameters of which an arbitrary neighboring pair have a progressively increasing difference and a second sequence of said medium parameters of which an arbitrary neighboring pair have a progressively decreasing difference, varying from the stored perspective representation parameter in the memory means to the input perspective representation parameter.

20. A perspective representation system according to claim 17, wherein the perspective picture generation means comprises:

an original picture memory means for storing a standard original picture, a horizontally contracted original picture, a vertically contracted original picture and a horizontally and vertically contracted original picture, a displayable picture memory means for storing a generated perspective picture;

an image reproduction means for executing a reproduction of partial images of the stored pictures in the original picture memory means to the displayable picture memory means and a reproduction of a partial image of the stored picture in the displayable picture memory means to the displayable picture memory means;

a medium parameter memory means for storing perspective representation parameters corresponding to the perspective picture stored in the displayable picture memory means; and a perspective representation control means responsive to the perspective representation parameters input from the medium parameter generation means and the perspective representation parameters stored in the medium parameter memory means for determining, for each subregion divided by separation lines of the perspective picture based on the perspective representation parameters input from the medium parameter generation means, a reusable subregion and an unreusable subregion of the perspective picture in the displayable picture memory means for editing an image of said subregion, and for instructing the image reproduction means to designate, for a reproduction of the reusable subregion, a region of the displayable picture memory means for the reproduction therefrom and a region of the displayable picture memory means for the reproduction thereonto and, for a reproduction of the unreusable subregion, a region of the original picture memory means for the reproduction therefrom and a region of the displayable picture memory means for the reproduction thereonto, before storing the input perspective representation parameters from the medium parameter generation means into the medium parameter memory means.

21. A perspective representation method comprising the steps of:

inputting a perspective representation parameter;

generating a plurality of medium parameters of a perspective picture;

storing the perspective representation parameter;

generating the perspective picture;

displaying the perspective picture depending on the perspective representation parameter;

providing a plurality of said medium parameters varying from the stored perspective representation parameter to the input perspective parameter; and storing the perspective representation parameter.

* * * * *

UNITED STATES PATENT AND TRADEMARK OFFICE
CERTIFICATE OF CORRECTION

PATENT NO.    : 5,726,716
DATED         : March 10, 1998
INVENTOR(S)   : Toru EGASHIRA et al.

It is certified that error(s) appears in the above-identified patent and that said Letters Patent is hereby corrected as shown below:

Col. 4, line 19, change "818" to --813--.

Signed and Sealed this

Fifth Day of January, 1999

Attest:

Attesting Officer

*Acting Commissioner of Patents and Trademarks*